US005790828A

United States Patent [19]
Jost

[11] Patent Number: 5,790,828
[45] Date of Patent: Aug. 4, 1998

[54] DISK MESHING AND FLEXIBLE STORAGE MAPPING WITH ENHANCED FLEXIBLE CACHING

[75] Inventor: Larry Thomas Jost, St. Louis, Mo.

[73] Assignee: Southwestern Bell Technology Resources, Inc., Austin, Tex.

[21] Appl. No.: 724,149

[22] Filed: Sep. 30, 1996

Related U.S. Application Data

[63] Continuation of Ser. No. 53,655, Apr. 29, 1993, abandoned.

[51] Int. Cl.$^6$ .................... G06F 12/02; G06F 12/10; G06F 13/16
[52] U.S. Cl. .................. 395/404; 395/440; 395/441; 395/464; 395/412
[58] Field of Search ................... 395/441, 440, 395/464, 404, 412

[56] References Cited

U.S. PATENT DOCUMENTS

| | | | |
|---|---|---|---|
| 4,399,503 | 8/1983 | Hawley | 395/440 |
| 4,433,374 | 2/1984 | Hanson et al. | 395/465 |
| 4,530,055 | 7/1985 | Hamstra et al. | 395/463 |
| 4,811,203 | 3/1989 | Hamstra | 395/469 |
| 5,146,578 | 9/1992 | Zangenehpour | 395/464 |
| 5,241,666 | 8/1993 | Idleman et al. | 395/872 |
| 5,315,602 | 5/1994 | Noya et al. | 371/40.4 |
| 5,410,667 | 4/1995 | Belsan et al. | 395/441 |
| 5,423,046 | 6/1995 | Nunnelley et al. | 395/441 |
| 5,530,845 | 6/1996 | Hiatt et al. | 395/500 |

FOREIGN PATENT DOCUMENTS

| | | |
|---|---|---|
| 0586117 | 3/1994 | European Pat. Off. |
| 1231570 | 5/1971 | United Kingdom |
| 1310467 | 3/1973 | United Kingdom |
| 89/09468 | 10/1989 | WIPO |

*Primary Examiner*—Eddie P. Chan
*Assistant Examiner*—Reginald G. Bragdon
*Attorney, Agent, or Firm*—Greenblum & Bernstein P.L.C.

[57] ABSTRACT

A data processing system which includes a processor having a processor memory and a mechanism for specifying an address that corresponds to a processor-requested data block located within another memory to be accessed by the processor. A hierarchical memory system is provided, which includes a cache and a long-term storage. An address of a requested data block is translated to a second addressing scheme, and is meshed, so that proximate data blocks are placed on different physical target disks within the long-term storage. A user-configuration mechanism is provided, which allows the user to define one or more user-configurable parameters which will control the access to the cache, and the transfer of data between the processor and the cache and between the cache and the long-term storage.

18 Claims, 25 Drawing Sheets

3 REQUESTED BLOCKS

IN TERMS OF SOURCE DISK ADDRESSING

B1 = CYL n, HEAD m
B2 = CYL n, HEAD m + 1
B3 = CYL n, HEAD m + 2

NON-MESHED SYSTEM 59A   MESHED SYSTEM 59B

CACHE/REQUESTOR — B1,B2,B3
I/O PATH 60
62 — B1,B2,B3
MESH FACTOR = 1

CACHE REQUESTOR — B1,B2,B3
I/O PATH 60
62a, 62b, 62c
B1  B2  B3
MESH FACTOR = 3

Fig - 8

| | | |
|---|---|---|
| 76 — | CONFIG-ID | FILENAME |
| 78 — | MF_NUM_CHANNELS | 1 |
| 80 — | MF_NUM_DISKS | 2 |
| 82 — | MF_BASE_ADDRESS | 60 |
| 84 — | SCSI_MAP | 0 |
| 86 — | SCSI_MESH_FACTOR | 2 |
| 88 — | SCSI_NUM_DISKS | 2 |
| 90 — | SCSI_SECTOR_SIZE | 512 |
| 92 — | SCSI_SECTORS_PER_DISK | 3764794 |
| 94 — | SCSI_SECTORS_PER_MF_TRACK | 94 |
| 96 — | SCSI_VERIFY_WRITE | 0 |
| 98 — | CACHE_DRAIN_ON_READ | 0 |
| 100 — | CACHE_DRAIN_ON_WRITE | 1 |
| 102 — | CACHE_READ_AHEAD_TRACK_COUNT | 1 |
| 104 — | CACHE_MAX_DYN_SLEEP | 3 |
| 106 — | CACHE_MAX_TO_ONE_OVER | 2 |
| 108 — | CACHE_MIN_DYN_SLEEP_THRESHOLD | 750 |
| 110 — | CACHE_NUM_BUFFERS | 175 |
| 112 — | CACHE_MIN_DYNAMIC_SLEEP_TIME | 500 |
| 114 — | CACHE_UPDATE_LOG | 0 |
| 116 — | CACHE_READ_PRESERVE_PERCENT | 85 |
| 118 — | CACHE_PREREAD_PRESERVE_PERCENT | 85 |

74

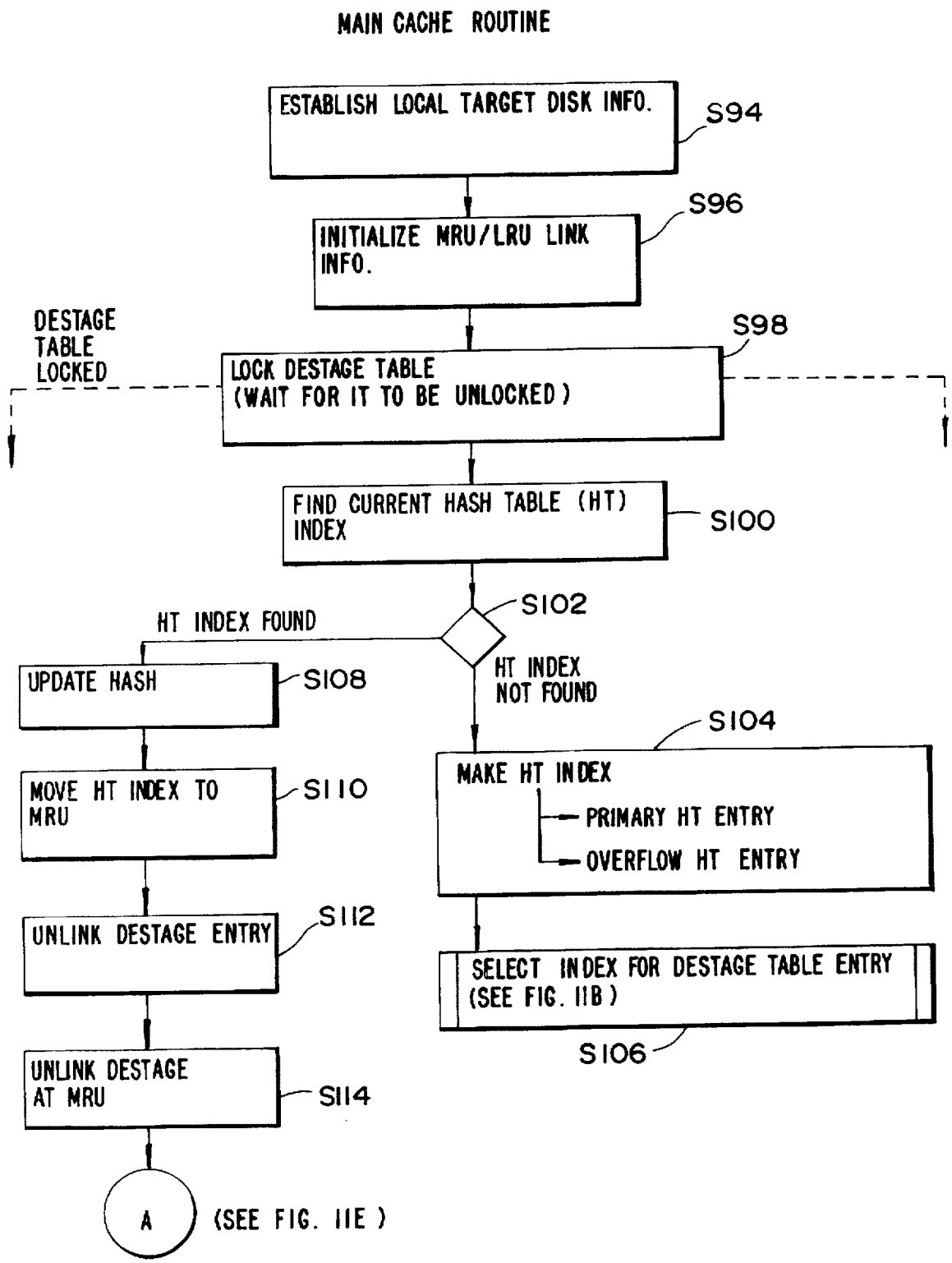

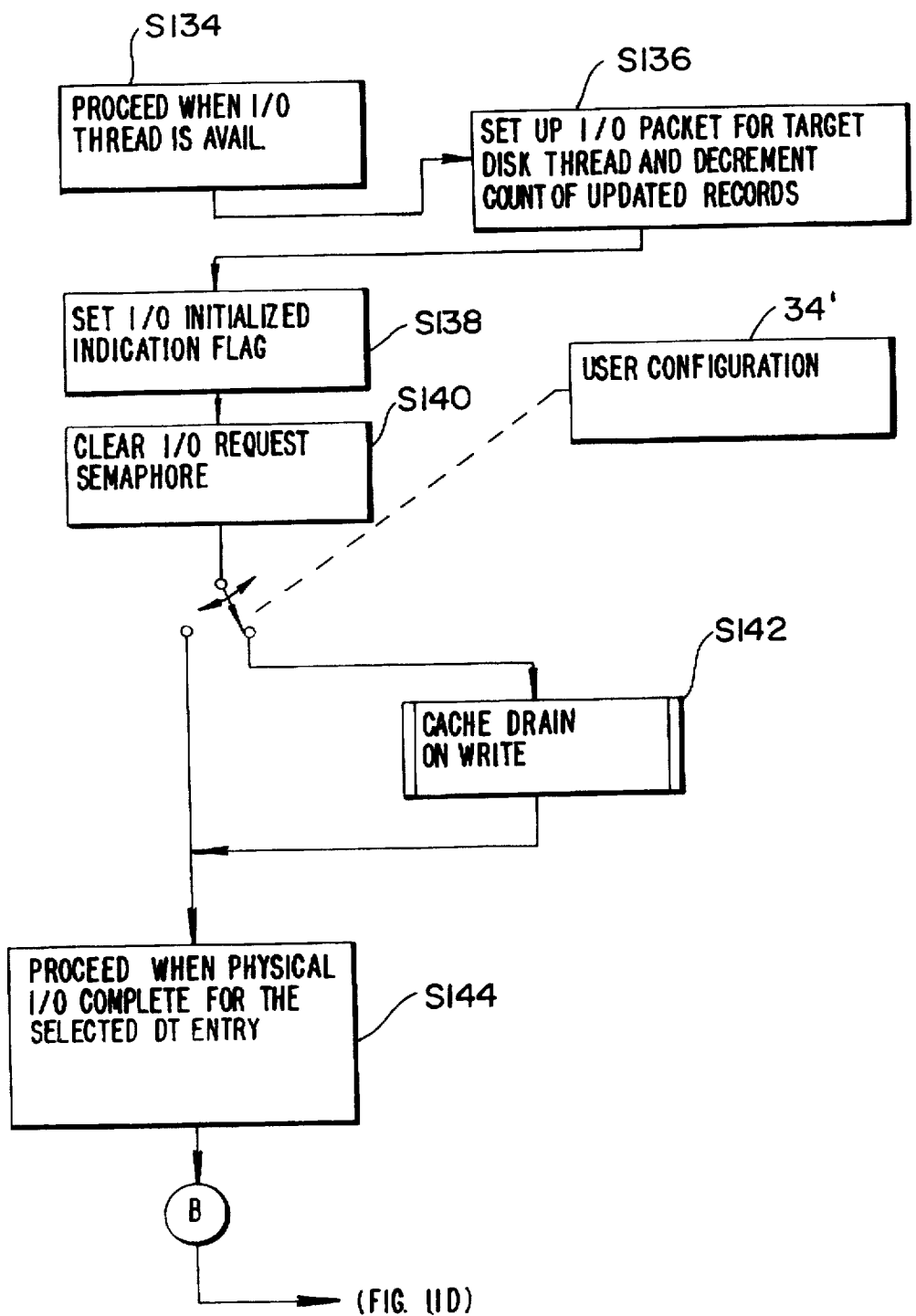

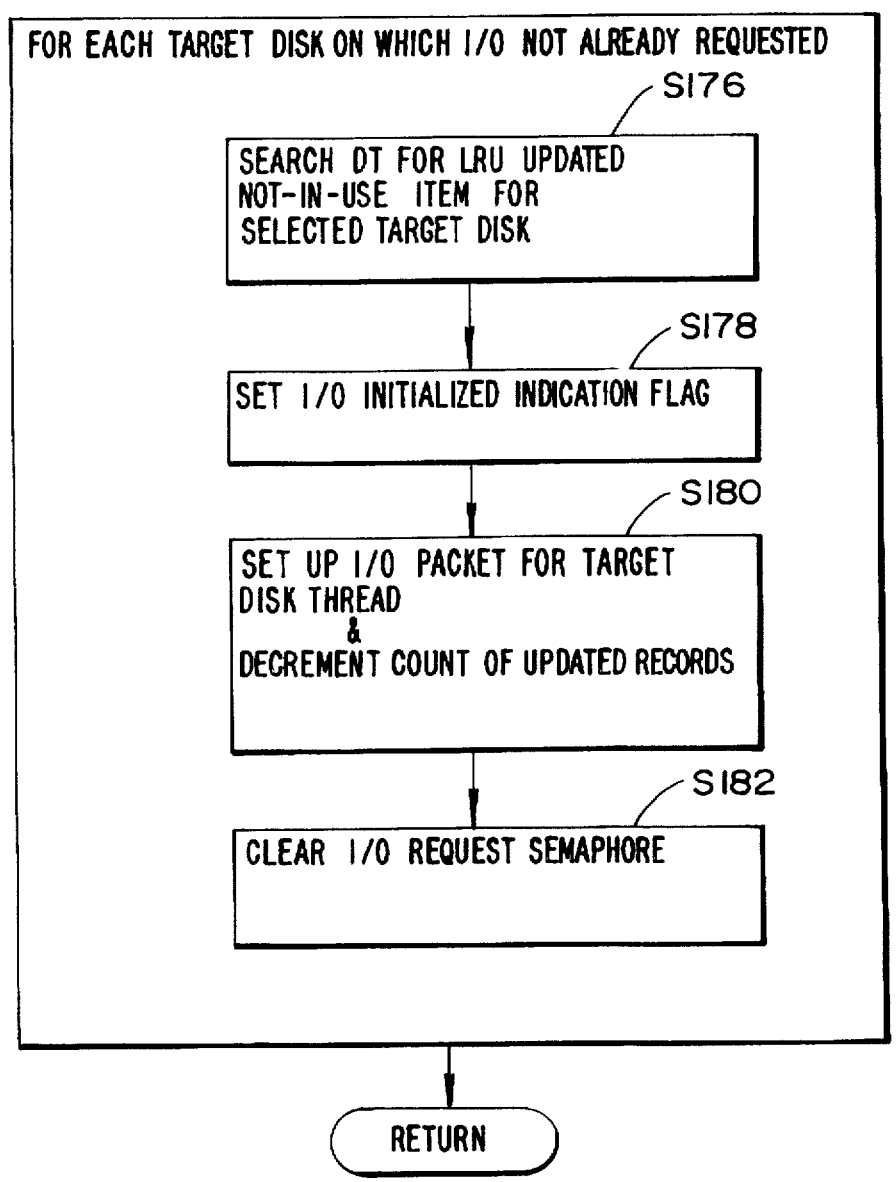

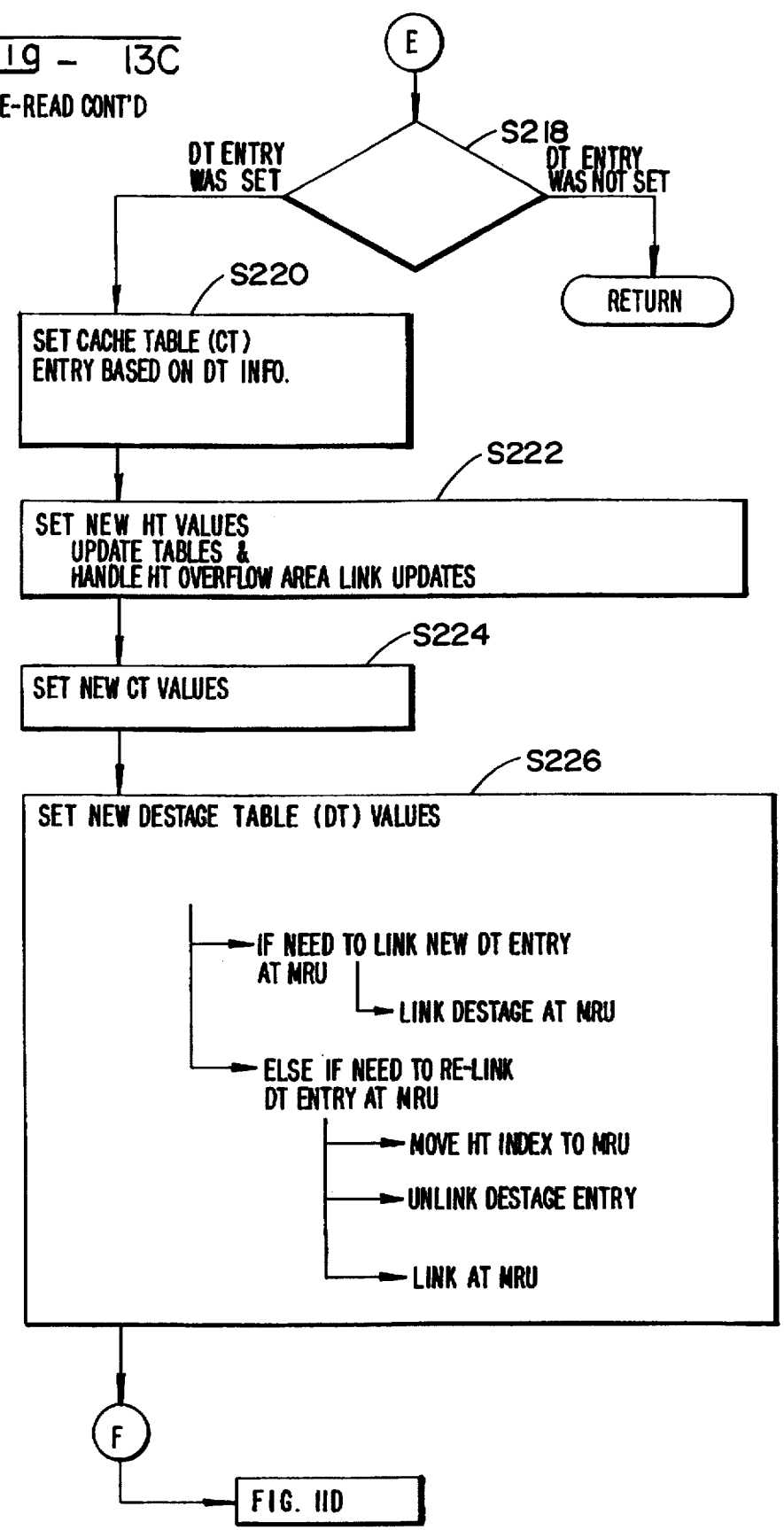

PRE-READ CONT'D

DISK MESHING AND FLEXIBLE STORAGE MAPPING WITH ENHANCED FLEXIBLE CACHING

This application is a continuation of application Ser. No. 08/053,655, filed Apr. 29, 1993, now abandoned.

FIELD OF THE INVENTION

The present invention relates to a system for managing the transfer of data between two memories. More particularly, the present invention is directed to a data processing system with a hierarchical memory sub-system having at least a first level memory and a second level memory.

DISCUSSION OF BACKGROUND INFORMATION

Computer systems are frequently provided with cache memory sub-systems of various types, in order to optimize the transfer of stored data within the system. One such type of cache memory sub-system utilizes disk caching. With disk caching, data intended for storage in disk storage (such as magnetic disk or rewritable optical disk) is first stored within an intermediate, quickly accessible memory (called a "cache").

Another storage mechanism for optimizing the transfer of stored data is called disk striping. In the process of disk striping, data intended for disk storage is divided into "stripes," and each stripe of data is written to a respective disk. Disk striping thus results in the concurrent transfer of several parts of a data block to several physical disks, and decreases the overall physical disk access time for the data block.

Some mainframe computers are provided with an interleaving mechanism for the mainframe computer memory. Interleaving is similar to disk striping, and may, at times, be rendered user configurable. With an interleaved mainframe memory, a block of data is divided into portions, and those portions are interleaved among separate locations within the mainframe computer's memory. This results in a decreased access time for retrieval and storage of data from and to the memory.

The general purpose of each of the above-described systems is to increase the efficiency of data exchanges between memories of a particular computer system. However, such memory I/O optimization mechanisms are frequently inflexible. That is, the parameters of such systems cannot be adjusted or changed by the user. In addition, such systems are frequently complex, and utilize unnecessary processing steps to achieve their objectives.

3. Definitions

For purposes of clarification, and to assist readers in an understanding of the present invention, a number of terms used herein are defined as follows:

Data Block

A single addressable unit of a disk (e.g., a track on a mainframe disk; or a sector on a SCSI disk).

Adjacent Data Blocks

Data blocks that have addresses, specified in terms of a requester's addressing scheme, that indicate a proximate relationship between the data blocks. For example, when a string of data blocks within a storage device is being assigned, by a processor, the blocks within that string are typically assigned sequential (i.e., adjacent) addresses.

SUMMARY OF THE INVENTION

In view of the above, the present invention, through one or more of its various aspects and embodiments, and/or subcombinations thereof, is thus presented to bring about one or more objects and advantages disclosed herein, such as those noted below.

It is an object of the present invention to provide a system for maximizing the efficiency of data exchanges between memory devices, such as, for example, between physical disks and a cache, and between a high level memory (e.g., a host processor memory) and a cache. A more specific object of the present invention is to provide a system for transferring data between a processor and large capacity long-term storage.

In accordance with a particular aspect of the present invention, several related data blocks that are stored in long-term storage may be concurrently accessed. The retrieved data blocks may then be placed in a cache for fast access by a requesting processor.

It is a further object of the present invention to provide a disk cache having a mechanism for draining data to a set of one or more disks, whereby the speed of I/O between the cache and the disks will not be significantly affected by the draining operation.

It is a further object of the present invention to provide a disk cache which performs a simplified pre-fetch operation, and brings non-requested data blocks from the disks into the cache, to be ready for subsequent access requests by the requesting processor.

A further object is to provide a simplified, enhanced, and efficient memory hierarchy. Another object is to render such a memory hierarchy user-configurable, so that several parameters of the memory hierarchy are adjustable by the user.

The present invention, therefore, is directed to a data processing system comprising several elements. A processor is provided, which operates on various data, and specifies a source address that corresponds to a requested data block located within a memory to be accessed by the processor. The processor requests allocation of memory space in order to hold a specified data string which has a length that requires a storage space of a specified plurality of data blocks. A memory allocation mechanism is provided for allocating blocks of memory space for the specified plurality of data blocks, and for assigning source addresses to each of the allocated blocks of memory. The assigned source addresses comprise a series of adjacent addresses, when possible.

A hierarchical memory system is provided for holding data, and comprises a first level memory and a second level memory. First data, which is held within the first level memory, is available for quicker access by the processor, as compared to second data, which is held within the second level memory. The second level memory includes a plurality of sub-memories, and a plurality of physical data exchange paths which are connected to respective ones of the sub-memories. The data processing system further includes an assignment mechanism which comprises a mapping device for mapping source-addresses to target addresses and a meshing device for assigning sets of adjacent source-addressed data blocks to sub-memories. The meshing device assigns each adjacent source-addressed data block within a given set to one or more sub-memories to which no other adjacent source-addressed data block within the given set is assigned.

In accordance with a particular aspect of the above-described data processing system, each of the data blocks are equal in length. In addition, each of the sub-memories may comprise a target disk, and the first level memory may include a cache.

In accordance with yet a further aspect of the above-described data processing system, each set comprises N adjacent source-addressed data blocks, and the meshing device assigns each data block within a given set to a respective one of the set of sub-memories.

In accordance with a further aspect of the present invention, a data processing system is provided which includes a processor, a hierarchical memory system, a storage control processor, a determining device, and a cache drain device. The hierarchical memory system includes a cache and a long-term storage. The storage control processor includes a device for providing processor access to a requested data block within the cache, and facilitates transfer of data between the processor memory and the cache, and between the cache and the long-term storage.

The determining device determines when the storage control processor is in an idle state and the drain device has been in an inactive state for a predetermined sleep time. The cache drain device drains the cache when the storage control processor is under several conditions, such as when the storage control processor is in an idle state and the drain device has been in an inactive state for a predetermined sleep time.

In accordance with a particular aspect of this data processing system, a user configuration device is provided for defining one or more user-configurable conditions, under which the cache drain device will perform a drain of the cache. A data processing system may further comprise a device for determining when the storage control processor has instructed a physical read of data from the long-term storage to the cache, and for performing a cache drain when the storage processor has instructed a physical read of data from the long-term storage to the cache.

A similar device may be provided for determining when the storage control processor has instructed a forced physical write of data, and for performing a cache drain when the determining device has determined that a forced physical write has been instructed. Similarly, a device may be provided for determining when the storage control processor has instructed a physical write of data, and for causing a physical drain operation to be performed when that condition occurs.

In accordance with yet a further aspect of the data processing system, a device may be provided for calculating the predetermined sleep time based upon several sleep variables, wherein the user configuration device will accept user configuration data specifying the several sleep variables. In this regard, the several sleep variables used to calculate the predetermined sleep time may include a maximum predetermined sleep time, over which the predetermined sleep time will not be set, and a minimum sleep time, under which the predetermined sleep time will not be set.

In accordance with yet a further aspect of the present invention, a data processing system is provided which includes a processor that operates on various data, a hierarchical memory system comprising a cache and a long-term storage, and a storage control processor. The processor comprises a processor memory and a mechanism for specifying an address that corresponds to a requested data block to be accessed by the processor. The storage control processor comprises several mechanisms, which, among other functions, provide processor access to the requested data block within the cache, transfer data between the processor memory and the cache and between the cache and the long-term storage, maintain a listing of the buffers within the cache, and identify as updated those cache buffers that have been written to. In addition, the storage control processor may be provided with a device for accessing a buffer within the cache that corresponds to the requested data block, and for reordering the accessed buffer so that the accessed buffer is placed at a most-recently-used location of the listing. The listing serves as a cache storage ordering list structure. A buffer assignment device may be provided, which is responsive to a physical read request by the processor, for assigning a cache buffer to hold the data block to be read from the long-term storage. The buffer assignment device comprises a search device for searching only a portion of the listing for an unupdated and not in use buffer, wherein the searched portion is remote from the most-recently-used location.

In accordance with yet a further aspect of the present invention, a data processing system is provided which comprises a processor, a memory allocation device, a hierarchical memory, and a storage control processor. The processor operates on various data, and includes a processor memory and a device for specifying a source address that corresponds to a requested data block. The processor further includes a device for requesting allocation of memory space in order to hold a specified data string. The data string has a length that requires a storage space of a specified plurality of data blocks.

The memory allocation device allocates blocks of memory space for the specified plurality of data blocks, and assigns source addresses to each of the allocated blocks of memory. The assigned source addresses include a series of adjacent addresses when possible.

The hierarchical memory comprises a cache and a long-term storage, and the storage control processor comprises a pre-fetch mechanism for making data blocks available within the cache for future access. The pre-fetch mechanism comprises a physical pre-read device, which is responsive to a request for access to a data block made by the processor. The pre-read device performs a physical read of data blocks having source addresses that are adjacent to the specified source address of the requested data block.

In accordance with yet a further alternative aspect of the present invention, a data processing system is provided which includes a processor that operates on various data. The processor comprises a processor memory and a device for specifying an address that corresponds to a requested data block. In addition, the data processing system includes a hierarchical memory system, having a cache and a long-term storage, a storage control processor, and a user configuration mechanism.

The storage control processor includes an access device for providing processor access to the requested data block within the cache, a first transfer mechanism for transferring data between the processor and the cache, and a second transfer mechanism for transferring data between the cache and the long-term storage. The user configuration mechanism defines one or more user-configurable parameters, based upon which the storage control processor will control the access device, the first transfer mechanism, and the second transfer mechanism.

The above-listed and other objects, features, and advantages of the present invention will be more fully set forth hereinafter.

BRIEF DESCRIPTION OF THE DRAWINGS

The present invention is further described in the detailed description which follows, by reference to the noted plurality of drawings by way of non-limiting examples of an illustrated embodiment of the present invention, in which like reference numerals represent similar parts or steps throughout the several views of the drawings, and wherein:

FIG. 8 illustrates an example user configuration file that may be used to configure the subsystem control mechanism of the illustrated embodiment;

FIGS. 11A–11E together comprise a flow diagram of the main cache routine performed by the storage subsystem control mechanism of the illustrated embodiment of the present invention;

FIG. 12 is a flow diagram which illustrates the cache drain-on-write and drain-on-read mechanisms of the illustrated embodiment; and FIGS. 13A–13D are flow diagrams that illustrate the pre-read processing of the illustrated embodiment.

DETAILED DESCRIPTION OF AN EXAMPLE EMBODIMENT

A. The Data Processing System

Figure 1:
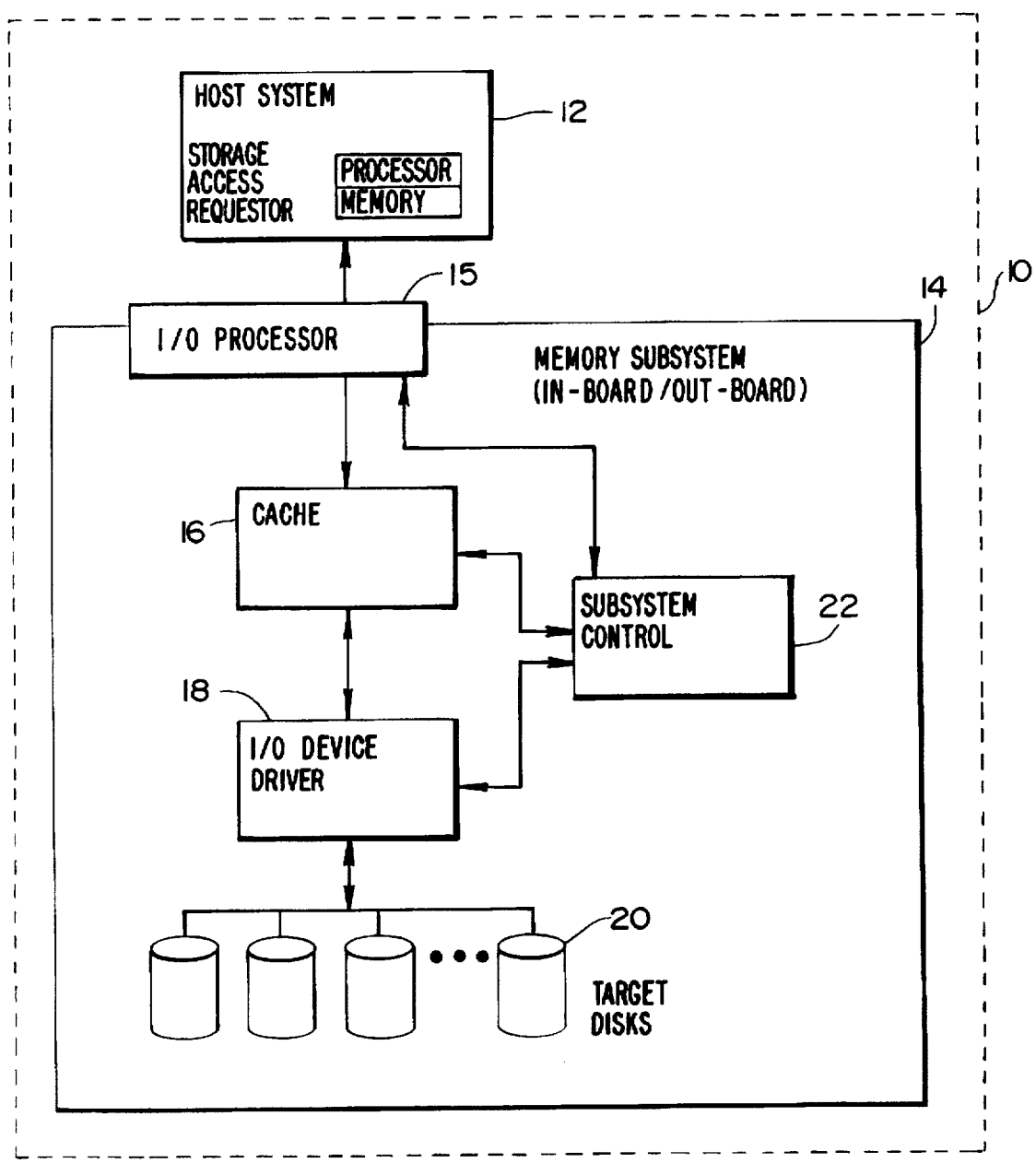
FIG. 1 is a system diagram of a data processing system comprising several elements of an illustrated example embodiment of the present invention.

Referring to the drawings now in greater detail, FIG. 1 illustrates a data processing system 10 having a host system (storage access requester) 12 coupled to a memory subsystem 14. All or a portion of memory subsystem 14 may be provided either in-board or out-board of a host computer system such as host system 12. Memory subsystem 14 comprises an I/O processor 15, a cache 16, an I/O device driver 18, and a plurality of target disks 20. Memory subsystem 14 is also provided with a subsystem control mechanism 22 which is functionally connected to each of the I/O processor 15, cache 16, and I/O device driver 18.

One potential implementation of the disclosed storage subsystem includes use within an emulating storage control system, such as that disclosed in allowed, commonly assigned U.S. patent application Ser. No. 08/373,896, filed Jan. 17, 1995, now U.S. Pat. No. 5,530,845, entitled "Storage Control Subsystem Implemented with an Application Program on a Computer," in the names of David M. Hiatt and Timothy R. Klos, which is a continuation of U.S. patent application Ser. No. 07/882,010, filed on May 13, 1992, now abandoned, the content of which is expressly incorporated by. reference herein in its entirety. It should be noted, however, that the memory subsystem, and each of the individually defined subcomponents thereof, may have independent significance in conjunction with other computer data processing systems or subsystems. In other words, the noted storage controller of the Hiatt et al. application is only one example of a system in which the present invention can be implemented.

B. Memory Subsystem Control

Figure 2:
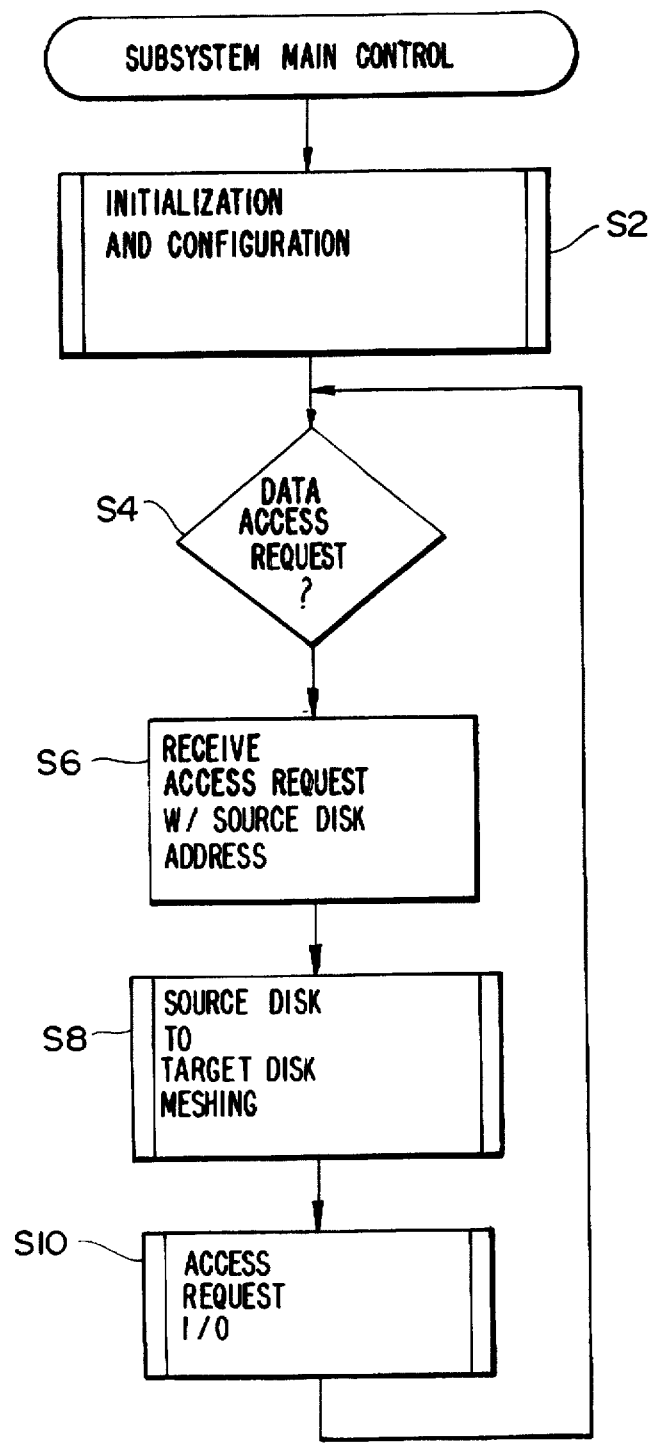
FIG. 2 is a flow diagram that illustrates the main control of the memory subsystem of the illustrated embodiment.

The operation of memory subsystem 14 is controlled by subsystem control mechanism 22; FIG. 2 is a flow diagram which illustrates several steps that may be performed by subsystem control mechanism 22. In step S2, subsystem control mechanism 22 initializes and configures the system, and thereafter proceeds to step S4, where the subsystem control awaits receipt of a data access request from the requester (host system 12). Upon receipt of a data access request, the subsystem control proceeds to step S6, at which time memory subsystem 14 receives, via I/O processor 15, the access request along with a source disk address, specifying an address of the requested data in terms of the requester's addressing scheme. Subsequently, at step S8, the source disk address is mapped and meshed to obtain a target disk address corresponding to a physical target disk 20 connected to the output of I/O device driver 18. The mapping and meshing will be described in more detail below with reference to FIGS. 5A–5D. Upon completing the meshing of the address specified by the requester in step S8, the process proceeds to step S10, where the necessary access request I/O processing is performed (see FIG. 3 for flow diagram of access request I/O). Thereafter, the subsystem control returns to step S4, where the system awaits a further data access request.

Figure 3:
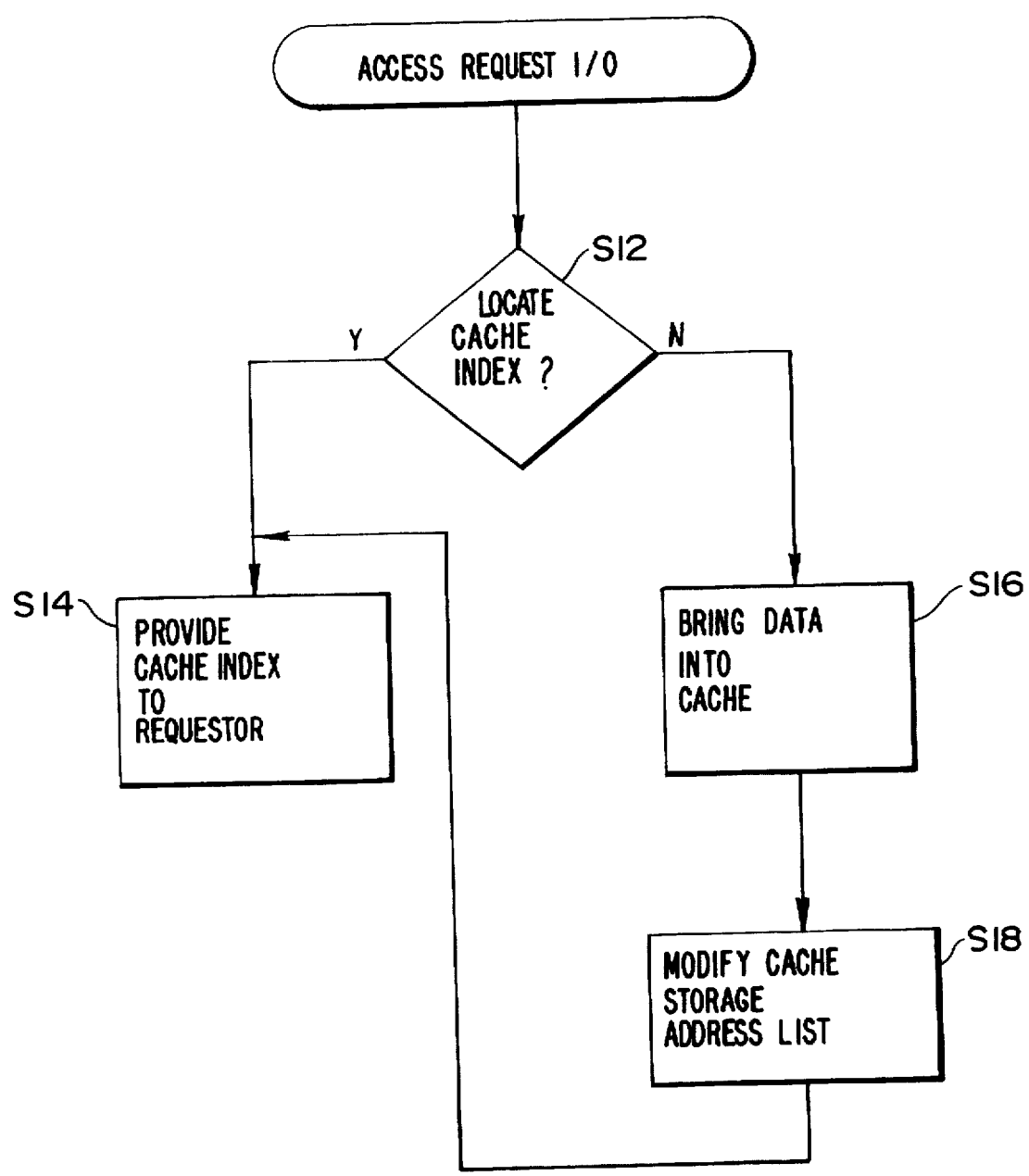
FIG. 3 is a flow diagram that illustrates the steps performed during execution of an access request I/O operation, in response to an access request made by a requesting host processor (requester)

FIG. 3 is a flow diagram which illustrates, in general terms, the access request I/O processing specified in step S10 of FIG. 2. The flow diagram in FIG. 3 demonstrates the general cache and storage retrieval operations of the illustrated system. Upon receiving a request for access to a particular data block from the requester, the access request I/O process is activated, and a determination is made in step S12 of whether the requested data block is located within the cache. The process determines whether a cache index corresponding to the data block is located within the cache storage address list. If the cache index for the requested data block is found, the system will await any pending I/O to the requested block's cache buffer and then, in step S14, the cache index is provided to the requester.

On the other hand, if the cache index is not located within the cache, meaning that the data block is not in the cache, and must be retrieved from the physical long-term storage, the process proceeds to step S16, and the data is brought into the cache. The storage address list of the cache is appropriately modified in step S18, and the cache index is provided to the requester in step S14.

As can be seen from FIG. 3, I/O requests are performed by a straightforward, simple caching mechanism. No complex processing is performed to determine whether or not data should be first placed into the cache before it is then given to the requesting host processor. Rather, in the illustrated embodiment, whenever an I/O access request is made by the requester, either the data is immediately retrieved from the cache (if available), or the data is placed in the cache before it is made available to the requester.

The illustrated embodiment memory I/O subsystem 14 responds to storage access requests made by the host requester 12 on a block-by-block basis. Predominant I/O time delays are usually caused by physical transfers of data to and from target disks 20. Accordingly, in order to access a particular block, that is not stored within cache 16, a physical I/O delay will be encountered. One significant feature of the illustrated embodiment of the present invention is that it performs physical data transfers to and from target disks 20 in a manner that will not significantly affect the overall data transfer completion time. In order to minimize the affect of physical transfer delays, whenever possible, subsystem control mechanism 22 will perform a physical data transfer of one or more data blocks concurrently with a physical transfer that is already being made for another purpose.

C. The Cache Draining Mechanism

One physical data transfer mechanism is the cache draining mechanism. Cache 16 will drain data therefrom, i.e., send the data to target disks 20, under several conditions. For example, the data will be drained when it must be drained, in order for an access request to be satisfied by a memory subsystem 14. Such a "must" drain (a forced physical write) occurs when there is not sufficient space within cache 16 to place a requested data block for subsequent access by requester 12. There is not sufficient space within the cache when there is no reusable block within the cache which could be reused without first being written out.

Figure 4A:
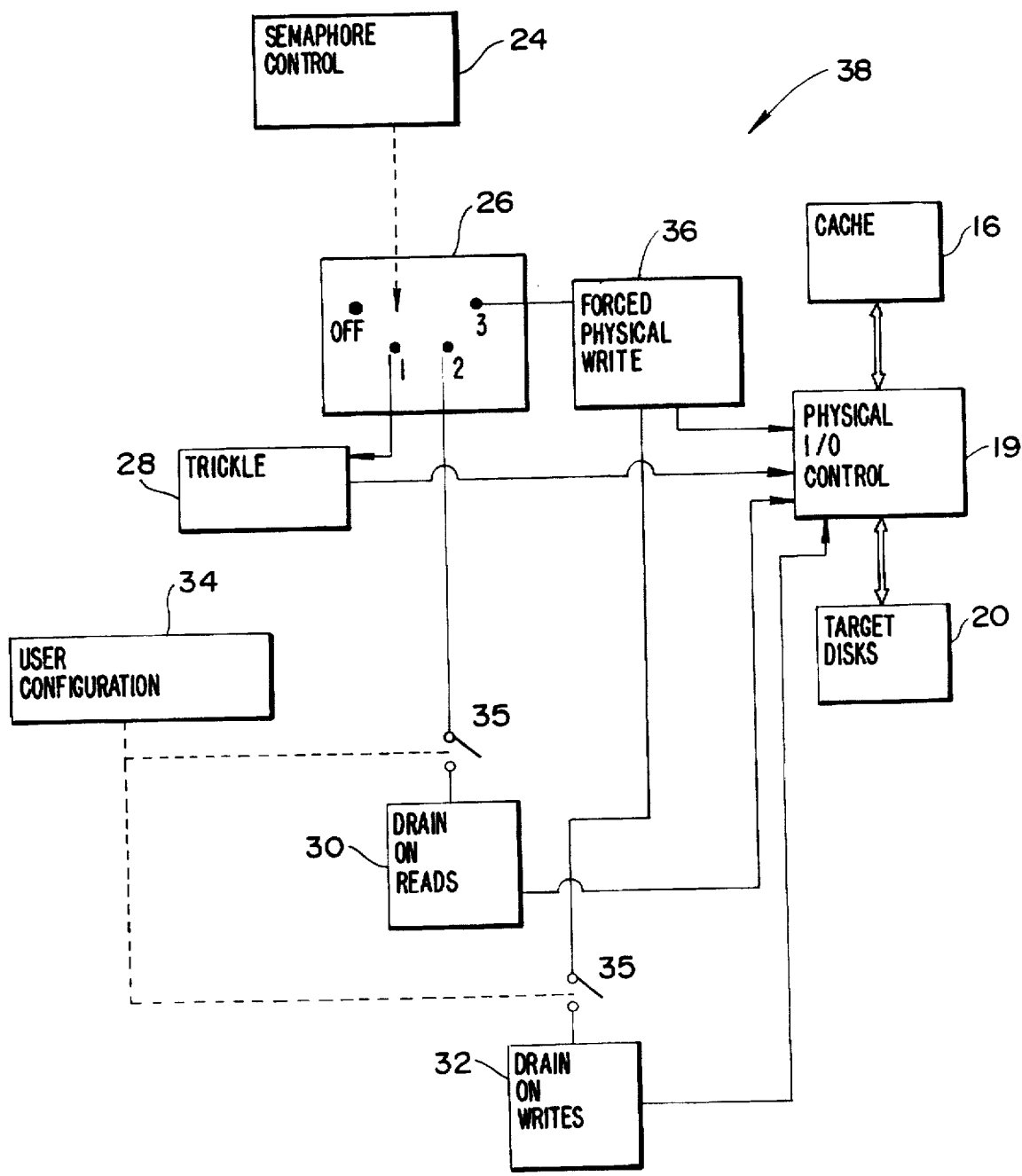
FIG. 4A is a functional block diagram illustrating the various function modules of the cache drain mechanism of the illustrated embodiment.

FIG. 4A illustrates a particular implementation of a draining mechanism 38 as provided in the example illustrated embodiment of the present invention. A software-implemented semaphore control mechanism 24 is coupled to a drain condition switch 26, which is in turn connected to several drain condition modules. Each of three positions of drain condition switch 26 is respectively connected to a trickle module 28, a drain-on-read module 30, and a forced physical write module 36. Forced physical write module 36 is also connected to a drain-on-write module 32. The outputs of each of modules 28, 30, 32 and 36 are each connected to a physical I/O control module 19 which is placed within the I/O path that extends between cache 16 and target disks 20. Each of trickle module 28 and forced physical write module 36 are functionally "hard-wired" to a respective switch position of drain condition switch 26. This means that each of these modules, in accordance with this embodiment, is provided as a standard feature of the illustrated cache system.

User configuration module 34 is coupled to user configuration switches 35 which each operate to functionally connect/disconnect each of drain-on-read module 30 and drain-on-write module 32. Accordingly, a user can configure the system to select whether or not the caching will perform a drain-on-read, as controlled by module 30, and/or a drain-on-write as controlled by module 32. In the particular embodiment referred to in FIG. 4A, the functions of each of the modules illustrated therein are implemented with software. However, it should be noted that one or more of these elements may perform their specified functions if implemented with hardware, software, or any combination of the same. The switching mechanisms illustrated in FIG. 4A are meant to demonstrate the functional aspects of the switches, and may be implemented by any appropriate well-known software mechanism, e.g., a semaphore or flag, or hardware mechanism. The functions of each of modules 28, 30, 32, and 36 will be more fully described hereinbelow with respect to specific example implementations.

A cache drain may be performed under several conditions. Such conditions may include when the cache is performing a physical read or a physical write operation (in which case the drain will be called a drain-on-read or a drain-on-write), when there is a forced physical write to a target disk (to give space to a cache so that a data block may be placed within the cache), when the memory subsystem becomes idle (such a drain is called cache trickle processing), and other certain conditions are met. The drain-on-read and drain-on-write conditions are each user-configurable, i.e., they can each be selected as operable by a user as desired.

Figure 4B:
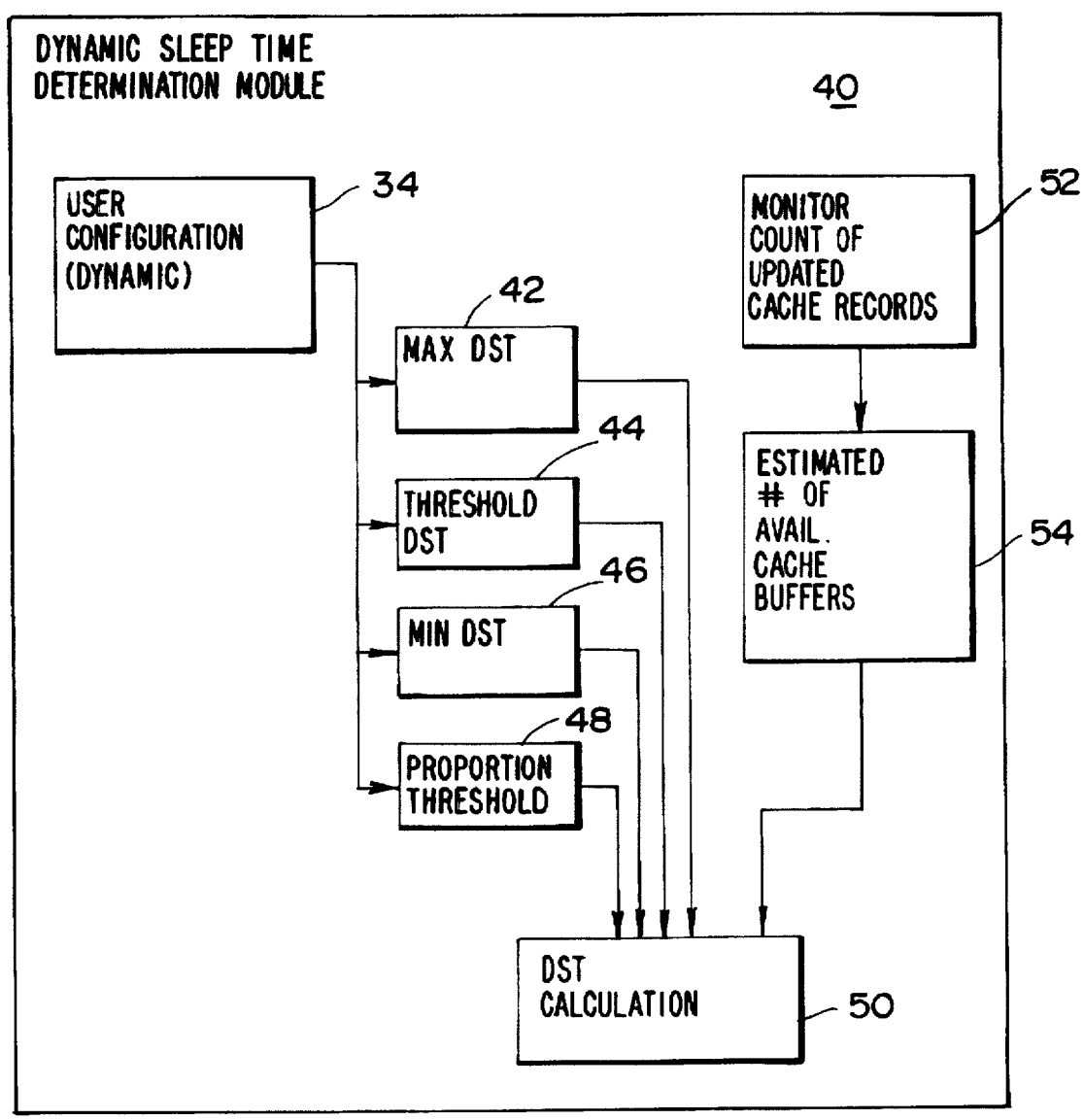
FIG. 4B is a functional block diagram illustrating the various function modules of the dynamic sleep time determination module of the illustrated embodiment.

FIG. 4B is a functional block diagram which illustrates a portion of the illustrated memory subsystem that relates to the cache trickle component of the drain mechanism. This portion of the memory subsystem is called the dynamic sleep time determination module. Referring to FIG. 4B, dynamic sleep time determination module 40 includes a user configuration module 34, several parameter storage modules 42, 44, 46, and 48, a DST (Dynamic Sleep Time) calculation module 50, a module 52 for monitoring the count of updated cache records, and an estimating device 54. The parameter storage modules include a MAX DST module 42, a Threshold DST module 44, a MIN DST module 46, and a Proportion Threshold module 48. Each of the parameter storage modules 42, 44, 46, and 48 hold respective parameter values that are specified by the user. Each of these values is placed within its appropriate module by user configuration module 34, and are set by the user during execution of a user configuration process.

In operation, dynamic sleep time determination module 40 determines the dynamic sleep time of the cache system; that is, the module 40 determines, with the use of DST calculation module 50, the required amount of time (called the DST) between actuations of the cache trickle component. The DST (since a last trickle attempt) must elapse before actuation of a trickle to the target disks will be allowed. A dynamic sleeping trickle is performed when the following conditions are detected by the system: (1) the complete memory subsystem is idle, (2) no cache processing is taking place, (3) there is no pending cache activity, and (4) the Dynamic Sleep Time (DST) has elapsed since the last trickle attempt.

The DST is calculated by DST calculation module 50, based upon the above-described user-configurable parameter values, and further based upon an estimated number of cache buffers available for re-use without a physical write, as determined by estimating module 54. Each of the user-configurable parameter values is defined specifically as follows: MAX DST (specified in terms of seconds) represents a maximum set dynamic sleep time. The proportion threshold (which is placed within proportion threshold storage module 48) represents a threshold ratio of the number of cache buffers available for re-use without a physical write to the total number of cache buffers. When more cache buffers are "available" than specified by this ratio, the DST time is set to the MAX DST value. MIN DST is the minimum dynamic sleep time of the system, and Threshold DST represents the threshold dynamic sleep time value which is utilized to determine the point at which the DST should be set to MIN DST.

The dynamic sleep time (DST) value is varied as a function of the estimated number of cache buffers available, as determined by the estimation module 54, when the estimated number of available buffers is within a certain range. However, when the estimated number of buffers reaches a level so as to cause the calculated DST to go below the threshold DST value, the DST is made equal to the MIN DST value. On the other hand, should the estimated number of available cache buffers increase to a proportion of the cache that exceeds the Proportion Threshold value, the DST is set to the MAX DST value.

The following describes an example algorithm for setting the Dynamic Sleep Time of the cache trickle mechanism:
IF
"Number of Cache Buffers" divided by the "Estimated Number of Available Cache Buffers" (can be re-used without first being written)
IS LESS THAN
the "Max To One Over" value
THEN
set the "Dynamic Sleep Time" according to the "Max Dynamic Sleep Time"
OTHERWISE
Set the "Dynamic Sleep Time" according to ("Estimated Number of Available Cache Buffers" divided by the "Number of Available Cache Buffers")
multiplied by
the "Max To One Over" value*
multiplied by the "Max Dynamic Sleep Time" . . . then check:
IF
"Dynamic Sleep Time" as calculated
IS LESS THAN
"Min Dynamic Sleep Threshold"
THEN
set the "Dynamic Sleep Time" to the "Min Dynamic Sleep Time"

* The "Max To One Over" value equals the inverse of the Proportion Threshold value. See, e.g., the description corresponding to FIG. 8, hereinafter, for a more detailed description of this parameter.

Settings identified as "according to" implies that some unit conversions are needed to perform the calculations correctly. These are not shown in this example, as they depend on the units assigned to the various parameters.

These calculations provide a Dynamic Sleep time value which is at the maximum allowed value when cache availability is at or exceeds the availability established by the Max To One Over usage point, and a linearly decreasing value to the Min Dynamic Sleep Threshold, at or below which the Min Dynamic Sleep Time will be used. Had there been no Minimum Threshold, the Dynamic Sleep Time calculated value would reach zero (0) when cache availability reached zero (0). "Availability" of cache is used throughout this illustration to indicate the estimated number of cache buffers presently available for reuse without first having to be written to secondary or slow storage.

D. The Mapping and Meshing Mechanisms

Figure 5A:
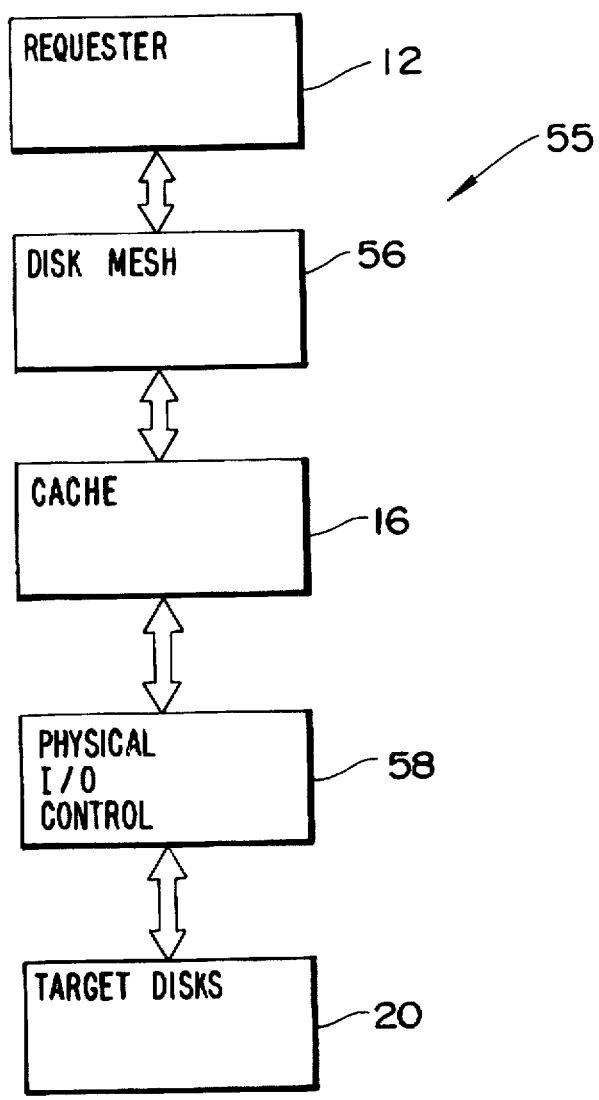
FIG. 5A is a functional block diagram that illustrates the main storage I/O path of the data processing system.

FIG. 5A illustrates the overall physical I/O path of the data processing system of the illustrated exemplary embodiment of the present invention. As illustrated in FIG. 5A, data moves along a physical path that comprises a requester 12, connected to a disk mesh module 56, cache 16, physical I/O control 58 and target disks 20. Each time requester 12 requests access to a specified data block having a particular source address, the address of the specified data block is translated to a target disk address that correlates with the configuration of target disks 20. Sets of N Data blocks that have adjacent source addresses are allocated, in a rotating manner, among a selected group of N target disks 20. Such a rotating allocation of the requested block constitutes a "meshing" of the I/O data among the N target disks. N represents the mesh factor of the meshing process.

The translated (i.e., mapped) and meshed target disk addresses are then utilized to reference data blocks within cache 16. If a data block is not available within cache 16, a physical I/O read operation is performed through the use of physical I/O control module 58. Subsequent to locating the data on target disks 20, and placing the same within cache 16, a cache index is then given to requestor 12 for access.

Figure 5B:
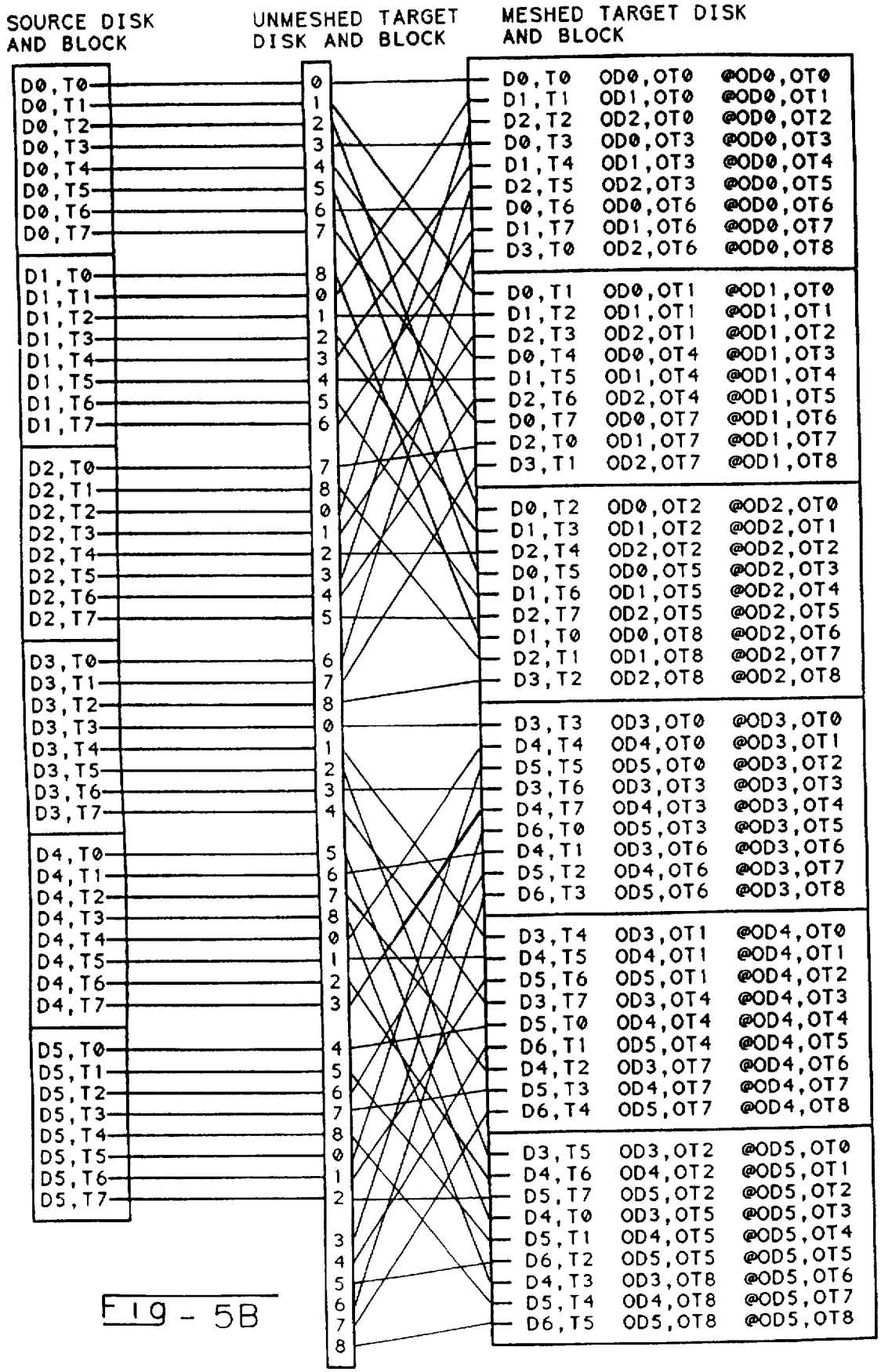
FIG. 5B illustrates the relative addressing and locations of data blocks as they are mapped and meshed from requester-specified source disks to physical target disks.

FIG. 5B shows an illustrative, but non-limiting, example of a disk mapping and meshing scheme executed by the subsystem control 22, wherein several source disks and block locations are mapped to an unmeshed target disk and block, and are subsequently meshed to a target disk and block. In the illustrated example, the mesh factor is set to 3, and the blocks are tracks. There are eight (8) blocks per source disk, nine (9) blocks per target disk, six (6) source disks and six (6) target disks. The illustration is greatly simplified for purpose of explanation. For example, it should be noted that the storage media illustrated are very small as compared to actual storage devices that are available on the market. However, the principles discussed herein are to be utilized in such actual storage devices.

The first, left-hand column of the illustrated diagram, labeled "Source Disk and Block," shows six (6) source disks (D0-D5), each with eight (8) blocks (tracks) identified as T0-T7. In a first phase of a disk mapping, the source disk number and block number are linearly mapped to a target disk addressing scheme. The second column heading, "Unmeshed Target Disk and Block," represents this intermediate step. Once an unmeshed target disk number and offset are determined for a given source disk number and offset, the unmeshed information is then meshed to a new mapping that corresponds to the physical target disks, which are shown below the column heading "Meshed Target Disk and Block."

Within the column labeled "Meshed Target Disk and Block," the final mapping results are shown. A first subcolumn provides original source disk numbers (Dn) and corresponding offsets (Tn) for each block of data. Corresponding unmeshed, linear target disk numbers (ODn) and offsets (OTn) are shown in the middle subcolumn, and the resulting meshed target disk numbers (@ ODn) and offsets (@ OTn) of the six (6) target disks are shown in the third subcolumn.

It is noted that the blocks in this illustration of each of the source disks and the target disks are equal in size. In implementation, the target disk blocks will likely comprise several smaller addressable target disk sectors which are sequentially accessed in order to store data from a single source disk block. For example, the target disk blocks may comprise 94 physical sectors, which correspond to the data of a single source disk track. For purposes of I/O, the block being transferred between the cache and the target disks corresponds to the size of the source disk block, and thus would include the necessary number of target disk sectors which can handle each source disk block.

Figure 5C:
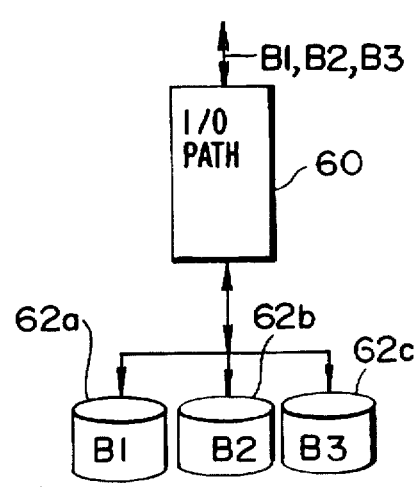
FIG. 5C is a comparison diagram which is presented to illustrate the relative operation of a meshed disk storage system as compared to a non-meshed disk storage system, when performing I/O of three requested sequentially addressed blocks of data, B1, B2, and B3.

FIG. 5C comprises a comparison diagram, in which a non-meshed storage system 59A and a meshed storage system 59B are each illustrated, and demonstrates the concurrent block I/O capability of a meshed storage system 59B. In the event that a physical I/O must be performed for three (3) requested blocks of data having adjacent source disk addresses, a non-meshed system (having an effective mesh factor of 1) will need to perform all I/O with the same disk. In comparison, in a meshed system, each of the adjacently addressed blocks B1, B2 and B3 will be present upon separate disks, and thus can be concurrently accessed in performance of the physical I/O.

In FIG. 5C, each of the requested blocks have, for example, addresses as follows: B1=cyl n, head m, B2=cyl n, head m+1, and B3=cyl n, head m+2. Each of the non-meshed system 59A and meshed system 59B requests all of the three requested blocks, B1, B2 and B3, and includes an I/O path 60. However, non-meshed system 59A includes only one non-meshed disk 62, which holds the requested blocks, while meshed system 59B includes three respective meshed disks 62a, 62b, and 62c, which include the rotatably allocated adjacently addressed blocks B1, B2 and B3. In the meshed system 59B, the mesh factor is equal to 3.

Figure 5D:
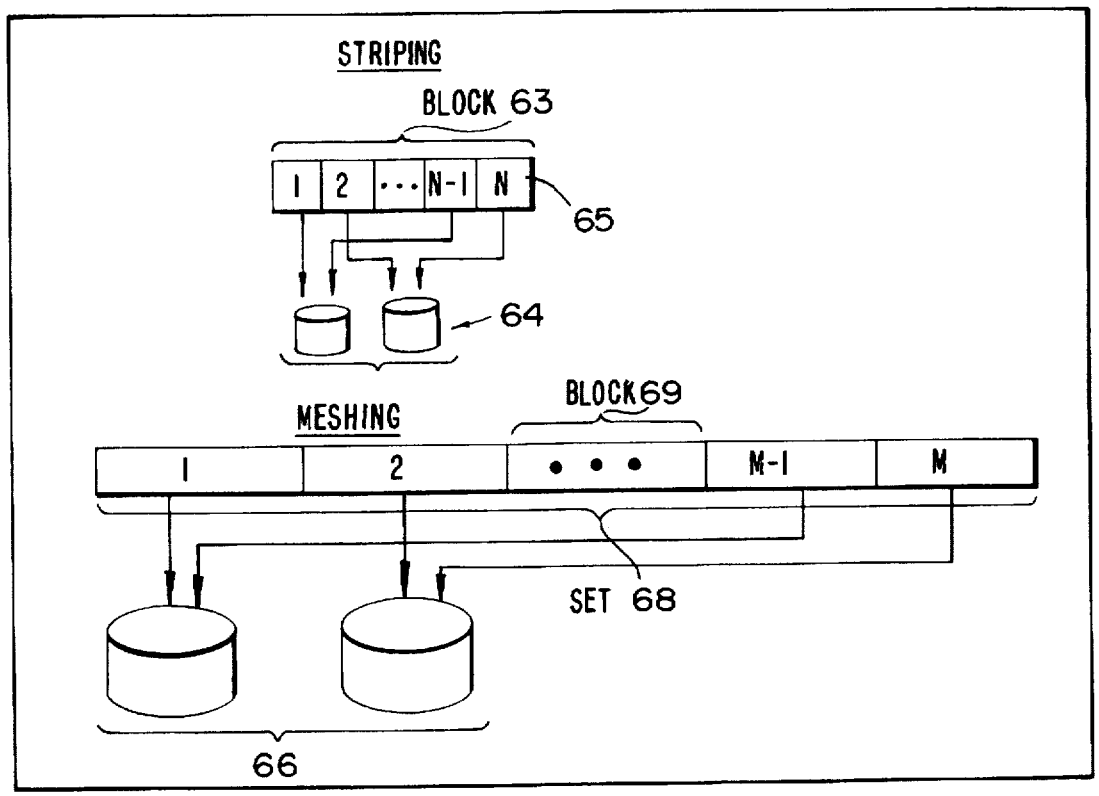
FIG. 5D is a comparison diagram which demonstrates the relative operation of disk striping as compared to meshing.

Meshing should be distinguished from systems which perform striping. FIG. 5D compares a method of striping with the method of meshing which is utilized in the illustrated embodiment. Referring to FIG. 5D, in the striping example, a block 63 is divided into N segments 65, and sequentially positioned segments 65 within that particular block 63 are allocated among several illustrated striping disks 64. With meshing, a set 68 of sequential blocks 69 is distributed, on a per-block basis, among the respective meshing disks 66. Accordingly, as demonstrated by FIG. 5D, meshing is significantly different from disk striping, since meshing entails the rotating allocation of complete blocks of data, whereas striping divides each block into several portions, and allocates those sub-divided portions among different physical disks.

Calculation of Mapped and Meshed Disk Addresses:

In the mapping and meshing components of the present system, a first map initialization step is performed, in which the first block of each source disk is mapped to the target disk addresses in order to determine where each of the source disks starts, in terms of the target disk addressing scheme. In this regard, an unmeshed target disk address is calculated that corresponds to each first block of each source disk, using a linear one-to-one mapping. Then, the respective blocks are allocated, in a rotating manner, among a defined set of N target disks, wherein N represents the mesh factor.

In the example embodiment disclosed herein, several features should be specified for purposes of clarity. It is noted that the number of target disk blocks per storage disk block is an integer value of at least one, and each target disk is large enough to hold at least one source disk block worth of data. The number of target disk blocks per target disk is small enough to be completely contained within one target disk. This number is an integer value. The number of target disks per source disk may be designed so that the number of target disks comprises an even multiple of target disks per source disk (or such that the number of source disks comprises an even multiple of source disks per set of target disks), even if such a configuration results in incomplete target disk use. For example, if 1.8 source disks can fit onto one target disk, the configured size of the target disks may be modified so that the number of blocks utilized within each target disk will hold 1.5 source disks. With this configuration, two target disks will completely hold three disks, and would facilitate a mesh factor of either 1 or 2.

An example set of algorithms are described below to illustrate the specific calculations performed by the mapping and meshing components of the system. All of the reference values are integers, and the math is integer math, or modulo function math, as indicated.

The following comprises a set of initialization steps performed by the system to provide un-meshed target disk addresses that correspond to the first address of each source disk.

1) Initialize the unmeshed starting target disk number for the first source disk to 0.
2) Initialize the unmeshed starting target disk block offset for the first source disk to 0.
3) For each additional source disk configured, perform the following steps:
    1) Set a scratch value (A) to the target disk block offset for the prior source disk divided by the number of target disk blocks per source disk block. Then add to it the number of source disk blocks per source disk.
    2) Initially set the unmeshed starting target disk number offset to the starting target disk number for the prior source disk.
    3) If the scratch value (A) is greater than the calculated number of source disk blocks per target disk:
        1) Reset the unmeshed starting target disk number for the current source disk to itself plus: the integer part of the value that results from division of the scratch value (A) by the number of source disk blocks per target disk.
        2) Reset the unmeshed starting target disk block offset to the remainder of the division of the scratch value (A) divided by the number of source disk blocks per target disk, result multiplied by the number of target disk blocks per source disk block.
    4) If item 3 was false, leave the unmeshed starting target disk number as is and set the unmeshed starting target disk block offset to the scratch value (A) multiplied by the number of target disk blocks per source disk block.

The above-described initialization steps may be described in terms of pseudo-code as follows:

```
UnmeshedStartTargetDiskNumber[0]=0;
UnmeshedStartTargetOffset[0]=0;
for(I=1;i<NumberOfSourceDisks;i++)
{
    TempOffset=(UnmeshedStartTargetOffset[i-1]/
    Config.TargetBlocksPerSourceBlock)+
        NumberOfSourceBlocksPerSourceDisk;
    UnmeshedStartTargetDiskNumber[i]=Unmeshed
    StartTargetDiskNumber[i-1];
    if(TempOffset≥Config.SourceDiskBlocksPer TargetDisk)
    {
        UnmeshedStartTargetDiskNumber[+]=
        TempOffset/NumberOfSourceDisk
        BlocksPerTargetDisk;
        UnmeshedStartTargetDiskOffset[i]=(TempOffset %
        Config.SourceBlocksPerTargetDisk)*
        Config.TargetDiskBlocksPerSourceDiskBlock;
    }
    else
        UnmeshedTargetDiskOffset[i]=TempOffset*
    Config.TargetDiskBlocksPerSourceDiskBlock;
```

The addresses provided by the initialization steps described above are then used in the following mapping and meshing algorithm.

1) Set a scratch value (A) to the unmeshed starting target disk offset for the source disk number being referenced, divided by the number of target disk blocks per source disk block. Add to that result the source disk block number.

2) Calculate the unmeshed starting target disk offset for this source disk block as the remainder of the division of the scratch value (A) by the calculated number of source disk blocks per target disks, result multiplied by the number of target disk blocks per source disk block.

3) Calculate the unmeshed target disk number for this source disk block as the unmeshed starting target disk number for the source disk being referenced plus the integer part of the value that results from the division of the scratch value (A) by the calculated number of source disk blocks per target disk.

4) The above calculations provide a linear mapping of source disks onto target disks. The next phase of the mapping is to mesh the target disk blocks based on the user-specified mesh factor:

1) Set the final target disk number to use as the unmeshed starting target disk number divided by the configured mesh factor, result multiplied by the configured mesh factor. Add to this the result of dividing the unmeshed target disk offset by the number of target disk blocks per source disk block mod'd by the configured mesh factor.

2) Set the final target disk offset to use as the unmeshed target disk offset divided by the number of target disk blocks per source disk block, result divided by the configured mesh factor, result multiplied by the configured mesh factor, result added to the unmeshed target disk number mod'd by the configured mesh factor. Multiply the result so far by the number of target disk blocks per source disk block.

In terms of pseudo-code, the above-described steps are as follows:

```
TempOffset=(UnmeshedStartTargetDiskOffset[SourceDisk Number]/
    NumberOfTargetDiskBlocksPerSourceDiskBlock+Source
    DiskBlockNumber;
UnmeshedTargetDiskOffset=(TempOffset%NumberOfSourceDisk
    BlocksPerTeragetDisk) *
    NumberOfTargetDiskBlocksPerSourceDiskBlock;
UnmeshedTargetDiskNumber=UnmeshedStartTargetDiskNumber[
    SourceDiskNumber]+
    (TempOffset/NumberOfSourceDiskBlocksPerTargetDisk);
MeshedTargetDiskNumber=((UnMeshedTargetDiskNumber/
    Mesh Factor)*MeshFactor)+
    ((UnMeshedTargetDiskOffset/NumberOfTargetDisk
    BlocksPerSourceDiskBlock)% MeshFactor);
MeshedTargetDiskOffset=((((UnMeshedTargetDiskOffset/
    NumberOfTargetDiskBlocksPerSourceDiskBlock)/Mesh
    Factor)*MeshFactor) +
    (UnMeshedTargetDiskNumber%MeshFactor)) *
    NumberofTargetDiskBlocksPerSourceDiskBlock;
```

The mapping and meshing algorithm is described in terms of symbols as follows: Inputs:

a=UnMeshed Target Disk Offset for the starting block of an identified Source Disk as previously calculated.

b=UnMeshed Target Disk Number for the starting block of an identified Source Disk as previously calculated.

c=Number of Target Disk Blocks Per Source Disk Block.

d=Number of Source Disk Blocks Per Target Disk.

e=Source Disk Block Number.

M=Mesh Factor.

Intermediate Results t=Temporary Offset Value o=UnMeshed Target Disk Offset.

n=UnMeshed Target Disk Number.

Final Results

O=Meshed Target Disk Offset.

N=Meshed Target Disk Number.

$t=(a/c)+e$ $o=(t\%d)*c$ $n=(b+(t/d))$ $N=((n/M)*M)+((o/c)\%M)$ $O=((((o/c)/M)*M)+(n\%M))*c$

The above calculations assume a constant target disk size; however, modifications may be made to accommodate target disks of disparate sizes.

E. Passive Prediction Caching

The cache system of the illustrated embodiment of the present invention includes a mechanism, referred to herein as "passive prediction caching". With the use of passive prediction caching, non-requested data is pre-read, i.e., pre-fetched, so that it will be within the cache and ready for subsequent access requests made by the requester. Passive prediction caching does not require a prediction mechanism which predicts what data will be accessed based upon the tracking of data use. Rather, a set number of adjacently addressed (in source address) data blocks, that are adjacent (in source address terms) to a requested data block are pre-read when there is a request for access to the requested data block.

Figure 6A:
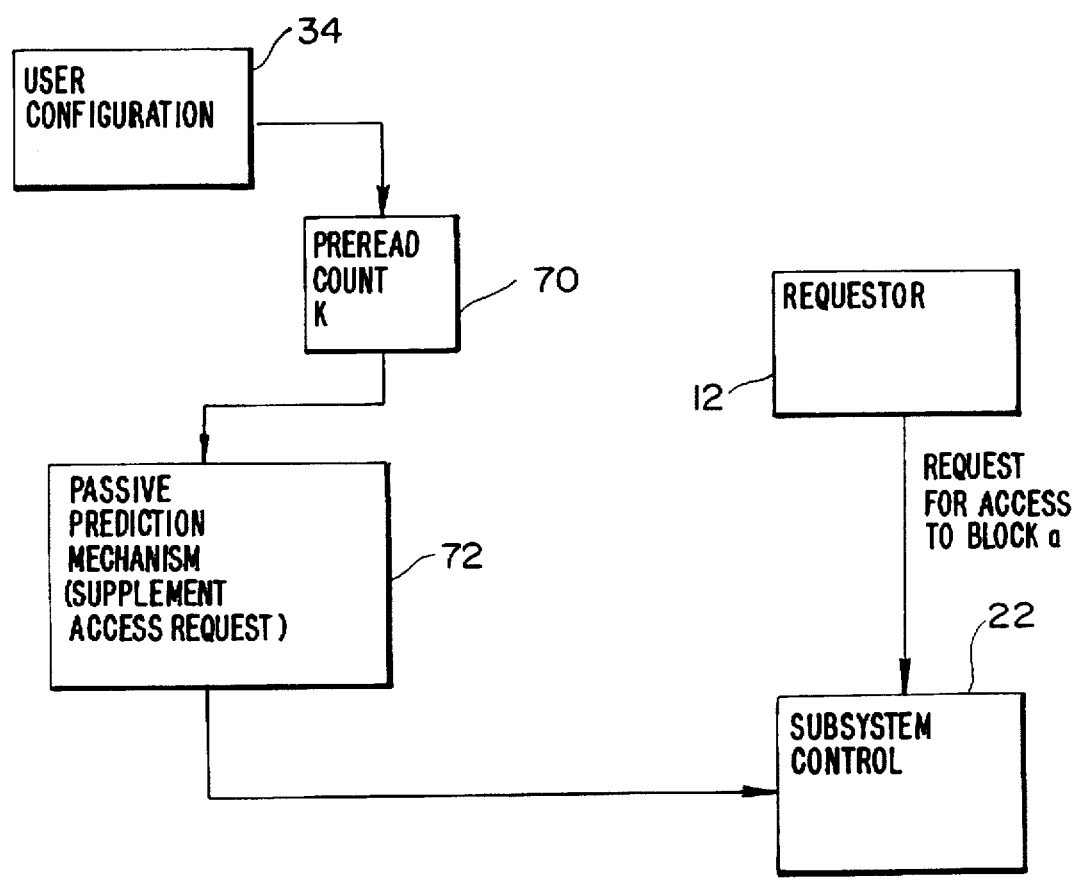
FIG. 6A is a functional block diagram illustrating the various function modules of the passive prediction caching system of the illustrated embodiment.

FIG. 6A shows an illustrative, but non-limiting, example embodiment of the passive prediction caching mechanism of the present invention. User configuration module 34 is connected to a pre-read count storage module 70, which is in turn connected to a passive prediction mechanism 72. Passive prediction mechanism 72 is then coupled to subsystem control 22, which is also connected to, inter alia, requestor 12.

In operation, requestor 12 initiates a request for access to block "a". Passive prediction mechanism 72 then initiates a supplemental access request, which may entail a physical read to the target disks, based upon a block that was requested, and also based upon the user- configured pre-read count k. Passive prediction mechanism 72 will then instruct the subsystem control 22 to perform the supplemental access request.

Figure 6B:
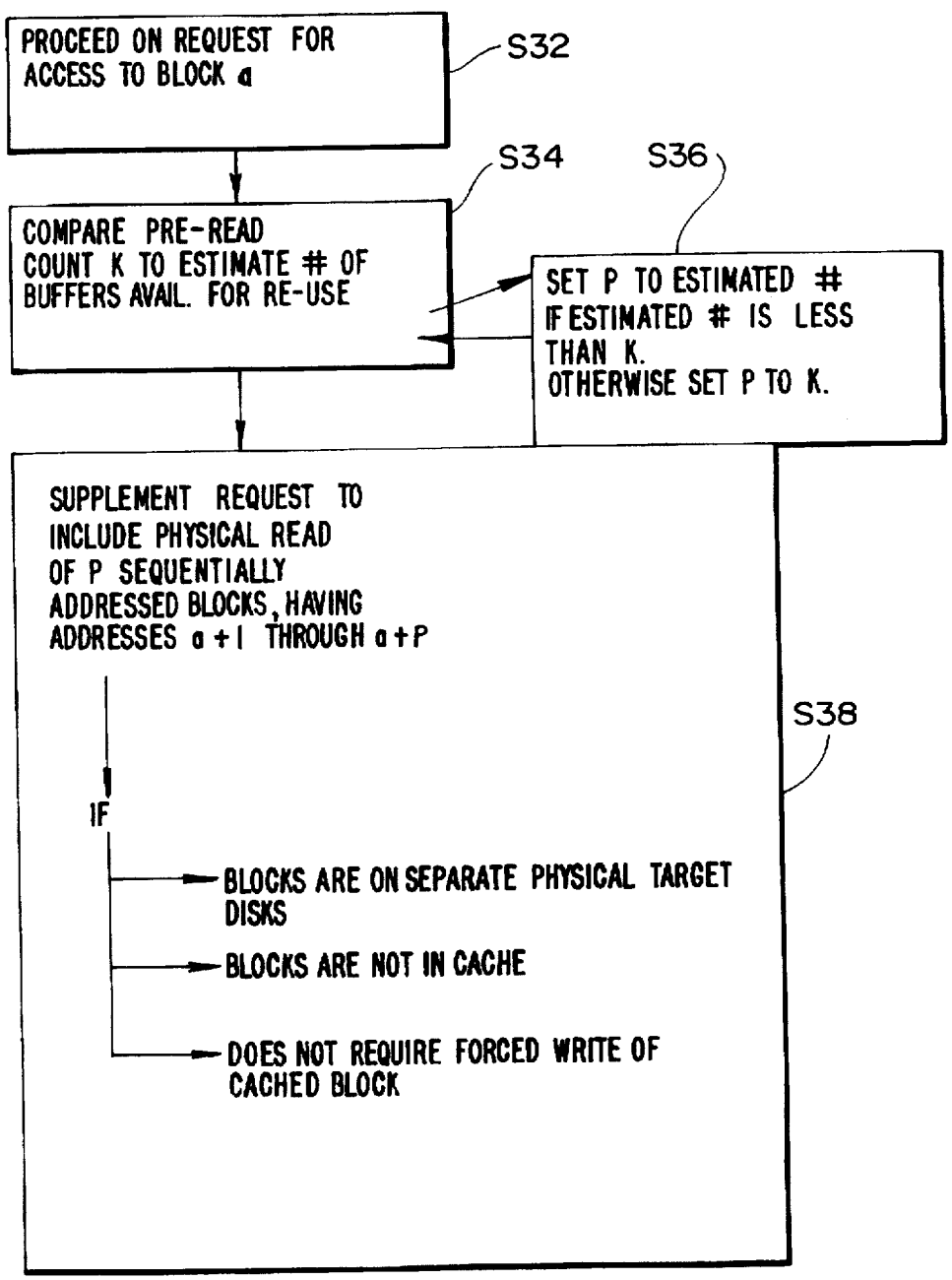
FIG. 6B is a flow diagram illustrating the various steps performed by the subsystem control mechanism of the illustrated embodiment during execution of the pre-read processing.

This process is illustrated in more detail in the general flow chart shown in FIG. 6B. At an initial step S32 of the pre-read processing, the storage subsystem control will wait for a request for access to a specified block a. Upon receipt of such an access request, the process will proceed to step S34, where the user configured pre-read count k will be compared to the estimated number of buffers available within the cache for immediate re-use. In this regard, step S36 is performed, in which a value p is set to the estimated number if the estimated number is less than k. However, if the estimated number is equal to or greater than k, p is set to k. Thereafter, step S38 is performed, in which the access request made by the requester is supplemented to include a physical read of p sequentially addressed blocks, having addresses a+1 through a+p (in terms of the source disk block addressing scheme, as specified by the requester), if several conditions are met. The specified conditions include the following: (1) each of the blocks to be physically read are on separate physical targets disks; (2) each block is not already in cache; and (3) each physical read does not require a forced write of a cached block, before the pre-read block can be placed within the cache.

The pre-read processing is passive in that it performs pre-reads in response to receipt of a request for access by the requester. In addition, the pre-read processing is highly efficient because physical reads of blocks are only performed if the respective blocks are on separate physical target disks. This allows physical transfers from the physical target disks to be concurrent, and greatly minimizes the physical data transfer time consumed by the pre-read process. The meshing of source disk data blocks maximizes the probability that data blocks to be pre-read all reside on different target disks.

Several safety mechanisms are provided to ensure that the pre-read does not impinge upon updated, or frequently used, data blocks that are within the cache. Accordingly, a number is estimated which represents the buffers available for re-use within the cache, and the number of physical reads that are performed by a pre-read process is based upon such an estimated number. In addition, unnecessary physical reads are not performed, such as, e.g., if the block is already in cache. Another time-saving aspect of the pre-read processing is that a pre-read will not be performed for a particular block if such a read requires forcing the write of a cached block. Each pre-read buffer is indexed with an MRU position within the destage list, once the corresponding physical read has been completed.

F. Frequently Read Data Preservation

Another significant feature of the illustrated embodiment of the cache system is the use of frequently read data preservation. With this system, not only will updated cache buffers be preserved, but un-updated cache buffers that are frequently read by the requester will also be preserved, under several conditions. Such a feature reduces or eliminates the need to thrash in and out of cache for data which is frequently accessed but seldomly or never updated. The system may be provided with a process that preserves un-updated, but frequently used, data buffers in the cache by limiting searches for available cache buffers, and by indexing the cache buffers so that the frequently used cache buffers are placed within in an area of an indexed list which will not be searched when looking for an available cache buffer.

Figure 7A:
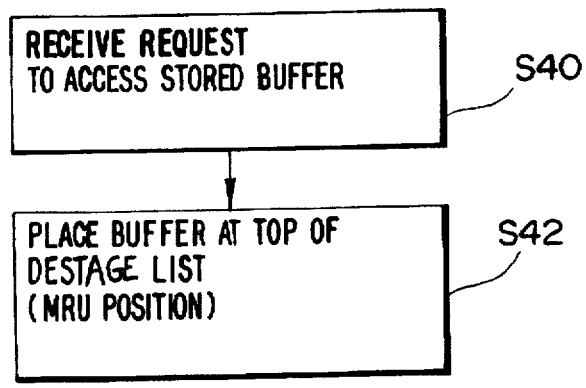
FIGS. 7A and 7B are flow diagrams that illustrate the steps performed by the subsystem control mechanism which relate to the preservation of frequently accessed data within the cache.
Figure 7B:
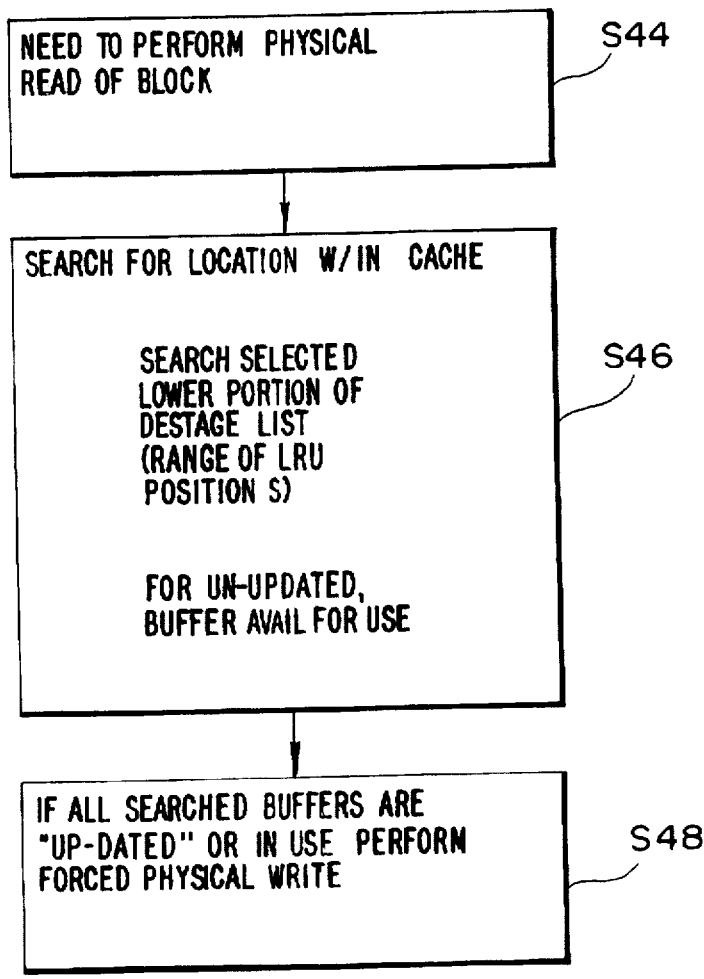

FIGS. 7A and 7B illustrate the relevant components of the storage subsystem control of the present invention which pertain to the frequently read data preservation. In FIG. 7A, step S40 is shown to represent the point in time at which the storage subsystem control receives a request to access a stored buffer. Whenever such a request to access a stored buffer is received, the process proceeds to step S42, at which time the buffer is placed at the top of the destage list (which corresponds to the MRU position).

Referring to FIG. 7B, when a physical read of a block must be performed by the system, as determined at step S44, the process proceeds to step S46, where an appropriate cache buffer is located so that the physically read block can be placed within that cache buffer. In performing step S46, a selected lower portion of a destage list is searched, which corresponds to a range of LRU positions. When an un-updated buffer is located within the selected lower portion of the destage list, and is thus available for use, that cache buffer is chosen for the location of the physically read block. Proceeding to step S48, if all searched buffers are "updated," or in use, a forced physical write is performed.

FIGS. 7A and 7B illustrate that whenever a request is received for access to a particular stored buffer, that buffer is placed at the top of a destage list, which corresponds to the MRU position of the destage list. Thereafter, whenever a physical read of a particular block is requested, the cache buffer which is used to store that physically read block will be obtained from a selected lower (LRU) portion of the destage list. Thus, the frequently accessed cache buffers, which would end up at or near the top of the destage list (within an MRU range of the list) will not be chosen for storage of a physically read block.

The user-configuration module of the system may be configured so that the size of the selected lower LRU portion of the destage table may be specified by the user, i.e., user-configurable. Separate sizes may be configured for ordinary reads and pre-reads.

G. User Configuration

Another significant feature of the illustrated memory subsystem of the present invention, and of each of several subcombinations thereof, is the flexibility and adaptability of the system. Several parameters of the system may be configured by the user depending upon the particular needs and physical constraints involved in a particular implementation. The user configuration aspects of the invention will now be described with reference to an illustrative, but non-limiting, example implementation.

In the illustrated embodiment, a user configuration file may be provided within the storage subsystem, and may include each of the user-configurable parameters of the system in the form of a list. The user can specify and/or modify the contents of the user configuration file, and reconfigure the system, either upon system initialization, or dynamically, by initiating an appropriate re-configuration process during run-time of the system. However, certain parameters within the user configuration file may not be dynamically altered.

A particular example implementation user configuration file is shown in FIG. 8. The example parameters given in the user configuration file illustrated in FIG. 8 have relevance in the context of a data processing system which includes a host processor which addresses IBM 3380 source disks, and is connected to a storage subsystem which emulates a 3990 storage controller, and which translates addresses so that data may be placed on target disks which comprise typical SCSI disks.

A config ID parameter 76 is provided at the top of the list contained in the user configuration file. Within this parameter, the user may provide a file name to identify each user configuration file. For example, the user may want to name a particular user-configuration file as a test file, as it may contain parameters which are used solely for testing purposes, while another file may be named a default file, and may contain a set of default parameters. A third file name may be given for a "system-under-strain" file that comprises parameters which should be used when the system is under stress due to excessive use.

Each parameter can be specified by placing an appropriate value alongside the name of the parameter. Each of these parameters has a particular use in various aspects of the illustrated storage subsystem described herein.

MF Num Channels parameter 78 represents the number of mainframe channels connected in the system. MF Num Disk parameter 80 represents the number of disks of the mainframe (called source disks) which are being emulated by the storage subsystems. MF Base Address parameter 82 represents the device subchannel address relative to the mainframe. SCSI Map parameter 84 represents a switch, which, when on, causes the system to provide a file that contains mapping information for subsequent viewing by a user. When the parameter is a 0, the switch is off; when the parameter is a 1, the switch is on. SCSI Mesh Factor parameter 86 represents the mesh factor of the storage subsystem, and thus the number of target disks (in this case SCSI disks) to which the linearly sequentially mapped source disk data blocks will be meshed. SCSI Num Disks parameter 88 represents the number of target disks hooked up to the system. SCSI Sector Size parameter 90 represents the target disk block size, in bytes. In this case, a SCSI sector is a target disk block. SCSI Sectors Per Disk parameter 92 represents the number of target disk blocks (SCSI sectors) per target disk. SCSI Sectors Per MF Track parameter 94 represents the number of target disk blocks per source disk block. SCSI Verify Write parameter 96 represents whether or not a verify write switch of the system is on or off. 0 representing an off condition, and 1 representing an on condition.

Cache Drain On Read parameter 98 indicates whether or not the system has been configured to perform a drain-on-read. 0 represents an off condition, and 1 represents an on condition. Cache Drain on Write parameter 100 similarly represents the configuration of the system with respect to performing a drain-on-write. Cache Read Ahead Track Count parameter 102 represents the pre-read count a, i.e., the number of blocks (tracks) which the system will attempt to read ahead (pre-read), when a request is made for access to a particular block. Cache Max Dynamic Sleep parameter 104 represents, in seconds, the maximum DST (Dynamic Sleep Time) which is used in calculating the DST for the cache trickle process of the cache storage subsystem. Cache Max to One Over parameter 106 is the threshold proportion. When the ratio of estimated available cache buffers to the total number of cache buffers goes below a value equal to 1 over the specified max-to-one-over value, the DST is reduced from the maximum value, and is determined based on a calculated value. Cache Min Dynamic Sleep Threshold parameter 108 represents the threshold DST value in milliseconds; when the calculated DST goes below this value, the DST is set to the minimum DST.

Cache Num Buffers parameter 110 represents the number of cache buffers. Cache Min Dynamic Sleep Time parameter 112 represents the minimum DST in milliseconds. Cache Update Log parameter 114 represents a switch indication. When the switch is set to on, the value is 1, and the system keeps track of the state of the cache buffers, and logs data corresponding to the cache buffers in a non-volatile fast memory (e.g., an SRAM).

A Cache Read Preserve Percent parameter 116 represents the percentage of the destage table, starting at LRU, to search for an "available" cache buffer before simply selecting an LRU entry which can be physically written to allow a physical read to be accomplished. A Cache Preread Preserve Percent parameter 118 represents the percentage of the destage table, starting at LRU to search for an "available" cache buffer to allow a pre-read to occur before terminating the pre-read due to unavailability of a cache buffer to re-use without first performing a physical write.

Several features may be provided in conjunction with a user configuration mechanism, such as the above example user-configuration file.

Soft meshing:

The mesh factor of a particular meshing process may be specified by the user. This allows the user to specify how many target disks should be meshed with a particular range of data that has been linearly mapped onto the target disks. The mesh factor value may be determined and specified by the user based upon such considerations as the anticipated access data characteristics, reliability of storage devices, risk assessment, and performance requirements. The meshing components are thus not hard-coded to a particular value, and the user may modify the mesh factor at subsystem initialization time, as desired.

Variable Mapping:

The cache system mapping process of the memory subsystem may be provided with considerable flexibility by rendering several variables of the process user-configurable. For example, the system could be configured so that any number of source disks having any particular designated size may be mapped onto any number of any size target disks, provided that the target disks I/O block size is less than the source disk I/O block size used for caching.

The configuration mechanism provided by the present invention may be implemented to specify several key values which define the mapping process. Such user-configurable values may include (1) the target disk capacity, (2) the target disk I/O block size, and (3) the number of targets disk blocks per source disk block.

User-Configurable Passive Prediction:

As noted above, the user may be able to specify a pre-read count k. This pre-read count may be any integer value up to one less than the mesh factor in the particular embodiment disclosed herein. Based upon the data characteristics and access characteristics of a system, the user can set the pre-read value to appropriately match the mesh factor and data access traits of the system. In this regard, the pre-read value setting can be based upon how much stored data is expected to be sequentially accessed. For example, one might configure the system to have a high pre-read count when sequentially addressed (in terms of the source disk address) data is being transferred from one storage device to another, thus resulting in a sequential access of large portions of data. Such a situation will typically occur during a load or a backup process. On the other hand, a lower pre-read count might be desired for regular random-access requests of data.

User-Configurable Cache Buffer Count:

The user-configuration mechanism of the present invention might also be implemented to allow the number of cache buffers to be specified by the user configuration mechanism. This allows the user to change this parameter, for example, if memory and hardware changes are made in the system. For example, if the cache system is implemented on a PC, with a multi-processing operating system, the cache memory allocated can be modified to allow other processes on the PC to have sufficient amounts of available memory.

Dynamically Configurable Cache Settings:

Many of the configuration file parameters may be deemed dynamically user-configurable, and thus may be changed during the operation of the cache system without system interruption. The remaining configuration file parameters would remain configurable only at system initialization. Several example parameters which would be appropriate for dynamic configurability include (1) drain-on-read, (on or off), (2) drain-on-write (on or off), (3) pre-read counts k, (4) maximum dynamic sleep time, (5) proportion of buffers used before reducing the dynamic sleep time from the maximum, (6) minimum (minimum dynamic sleep time), and (7) threshold below which to reduce dynamic sleep time to the minimum dynamic sleep time.

The dynamic user configuration and user configuration upon system initialization mechanisms may be implemented in any manner within the skill of the artisan.

As one illustrative, but non-limiting example, all of the configuration parameters stored in the user-configuration file may be read into a configuration data structure that is accessed by the cache system. Dynamic user-configuration may be implemented by means of a key-in mechanism. In response to a key-in by a user during run-time of the cache system, the system will enact a user-interface, such as a keyboard and screen, that allows several dynamically configurable parameters to be altered as they exist with the configuration data structure. The cache system may be configured so that it is continuously responsive to changes of dynamically-configurable parameters within the configuration data structure. The user-configuration can be provided with a screening/evaluating mechanism which checks parameter changes, and only allows dynamically-configurable values to be changed during run-time. All parameters may be changed at system initialization.

Configurable Verified Writes:

The user-configuration mechanism provided by the present invention may also be configured to allow an entry for setting whether or not the target storage devices should perform verify writes or not. For example, SCSI disks are provided with a verify-write mechanism, which allows a detection of errors at the time of write instead of waiting for a read operation to be performed. Accordingly, such a feature which is already provided in selected target storage devices, such as SCSI disk devices, can be utilized in conjunction with a mainframe storage subsystem, in accordance with a particular implementation of the present invention.

H. The Cache and I/O System

Figure 9:
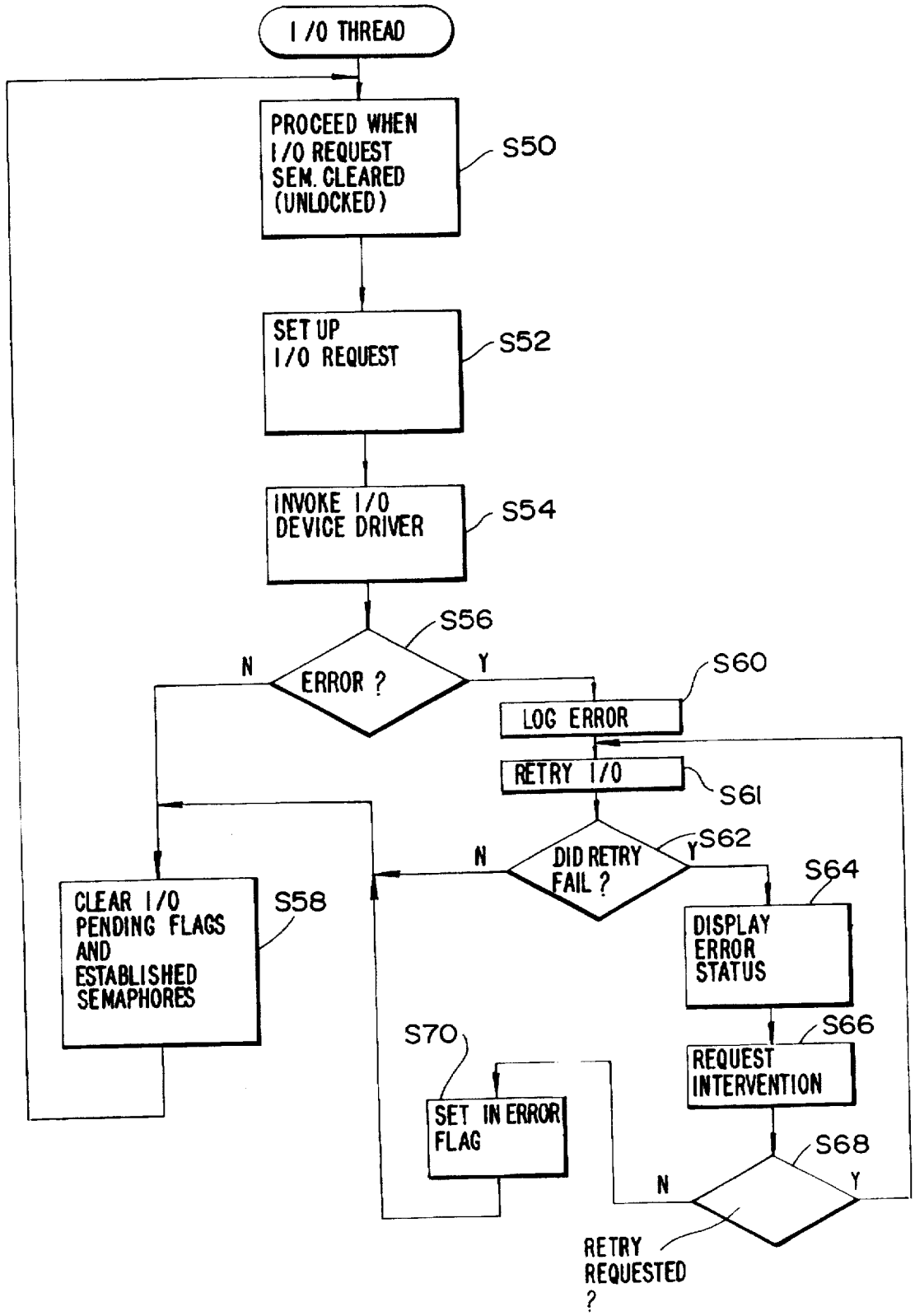
FIG. 9 is a flow diagram which illustrates the process of implementing an I/O thread to physically transfer data between the cache and a particular physical target disk.

In executing each physical data transfer (I/O request) to target disks 20, referring to FIG. 1, I/O device driver 18 sets up a unique I/O thread corresponding to each target disk 20 to be read from or written to. Each I/O thread is re-entrant, and is performed once its corresponding I/O request semaphore has been cleared. FIG. 9 is a flow chart which illustrates the operation of an I/O thread. In step S50, the I/O thread awaits the time when the I/O request semaphore corresponding to that particular thread has been cleared (i.e., unlocked). Upon clearing of the I/O request semaphore, the process proceeds to step S52, where the I/O request is set up. In this case, the set up of the I/O request entails conversion of an I/O packet of information to a packet suitable for the actual I/O interface (i.e., device driver). Thereafter, in step S54, the I/O device driver is invoked. In step S56, it is determined whether or not an error was encountered in invoking the I/O device driver. If an error was detected, the error is logged in step S60, and the process will re-try I/O in step S61. It is then determined whether or not the re-try failed in step S62. If it did fail, an error status is displayed at step S64, and intervention is requested at step S66. Thereafter, a determination is made at step S68 as to whether a re-try was requested, that is whether or not intervention was made. If intervention was made, the process returns to step S61, and I/O will be re-tried. If no such re-try or intervention was requested, the process proceeds from step S68 to step S70, and an in-error flag will be set. Subsequent to execution of step S70, the process proceeds to step S58, where the I/O pending flags and established semaphores are cleared. The same occurs if no error is detected in step S56; i.e., the process will proceed to step S58, and appropriate I/O pending flags and established semaphores are cleared. After step S58, the process returns to step S50, where the I/O thread awaits clearance of its particular I/O request semaphore. The I/O thread is thus again ready for another request.

Figure 10:
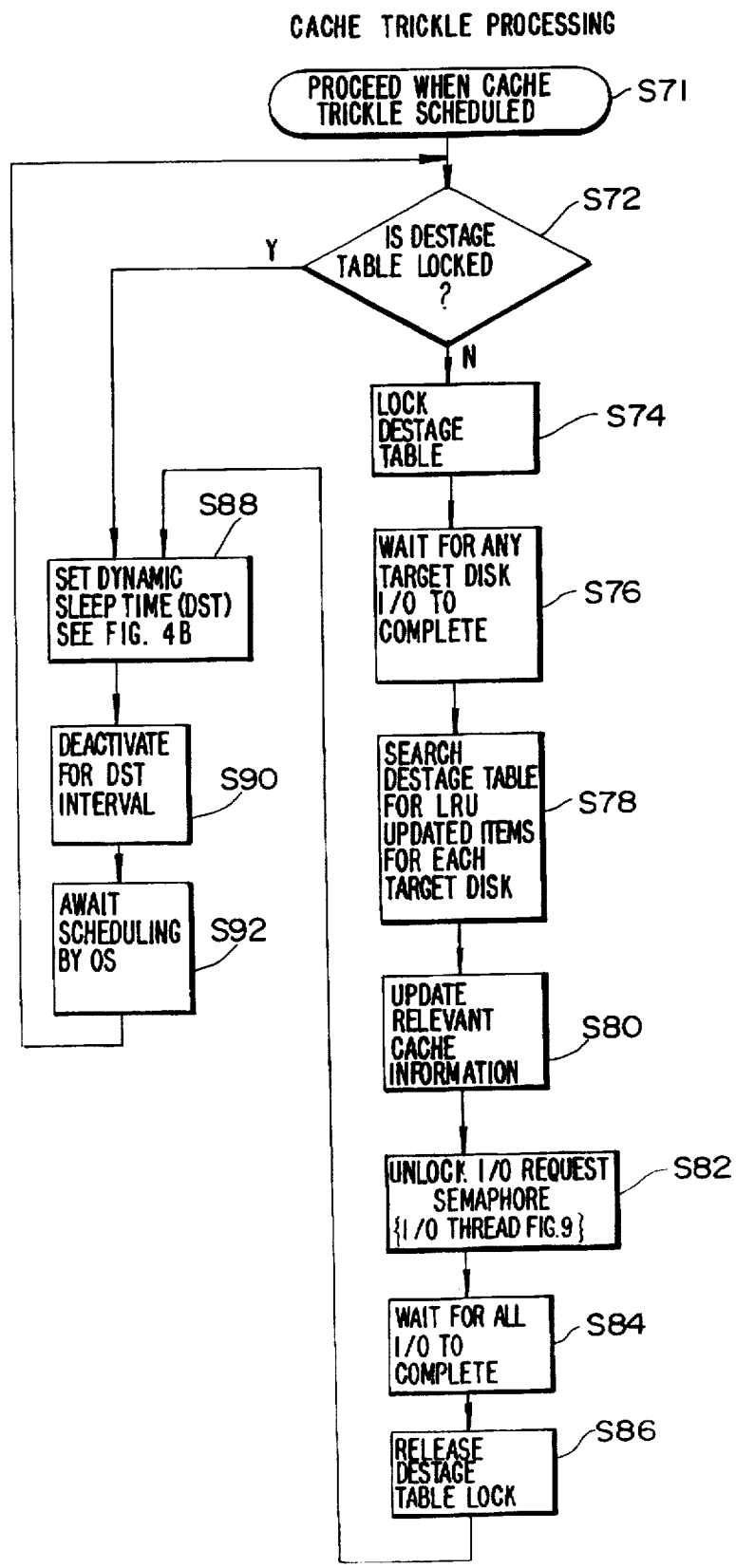
FIG. 10 is a flow diagram which illustrates the cache trickle processing.

As described above in an example embodiment, the cache of the overall system may perform cache trickle processing. FIG. 10 is a flow diagram which illustrates the general steps performed by the cache trickle processing. At step S71, the processing will wait until the cache trickle has been scheduled by the operating system (OS). Such a scheduling will occur only when the storage subsystem processor is idle to the OS. At step S72, a determination is made as to whether the destage table (DT) is locked. If the DT is locked, the process proceeds to step S88. If the DT is not locked, the process proceeds to S74, where the destage table is immediately re-locked. The cache trickle processing now has complete control over the destage table; no other process can access the destage table.

At step S76, the processing will wait for any target disk I/O's to complete. Once that step is completed, at step S78, the destage table will be searched for LRU updated items corresponding to each target disk connected to the system. Subsequently, at step S80, all relevant cache information is updated. At step S82, the appropriate I/O request semaphore, for the I/O thread of each target disk to be written to, will be unlocked/cleared. All I/O operations will then be performed in conjunction with the I/O threads, the execution of which is described above with reference to FIG. 9. At step S84, the process will await completion of all I/O to the target disks. Subsequently, at step S86, the destage table lock will be released, and the process will proceed to step S88.

At step S88, the dynamic sleep time (DST) will be set. The DST value is set as described above with reference to FIG. 4B. Then, at step S90, the process will be deactivated for the DST interval. Subsequent to expiration of the DST interval, at step S92, the process will again await scheduling by the OS. Such scheduling occurs only when the storage subsystem processor is idle to the OS. The process then returns to step S72.

A particular detailed example embodiment of a main cache routine which may be provided in order to implement the illustrated cache system of the present invention is illustrated in FIGS. 11A–11E. Sub-programs corresponding to the main cache routine are illustrated in FIGS. 12 and 13A–13D. These include the cache drain-on-read and cache drain-on-write processes which are illustrated in FIG. 12, and the pre-read process which is illustrated in FIGS. 13A–13D.

The illustrated example main cache routine will now be described, starting with the portion illustrated in FIG. 11A. At step S94, a target disk address is provided to correspond to a particular source disk data area. At step S96, the MRU/LRU link information is initialized. Thereafter, at step S98, the main cache routine will wait for the destage table to be unlocked, and then will immediately re-lock the destage table.

Subsequent to locking the destage table, at step S100, the current hash table (HT) index will be found which corresponds to the requested data block. If the HT index was found, thus indicating that the requested data block was within cache, the cache is updated at step S108, the HT index is moved to the MRU position at step S110, and the destage entry corresponding to the data block is unlinked and relinked at the MRU position in steps S112 and S114.

Referring back to the determination step S102, if the HT index was not found, that means that the requested data block was not within cache, and that several processing steps must be performed, as specified in steps S104 and S106. In step S104, an HT index is made. If possible, a primary hash table entry will be made to correspond to the requested data block, which will need to be physically obtained from the target disks. However, if no such primary hash table is available, an overflow hash table entry will be made, and the HT will be linked to the overflow entry. After the HT index is made, at step S106, an index is selected for a destage table entry.

Figure 11B:
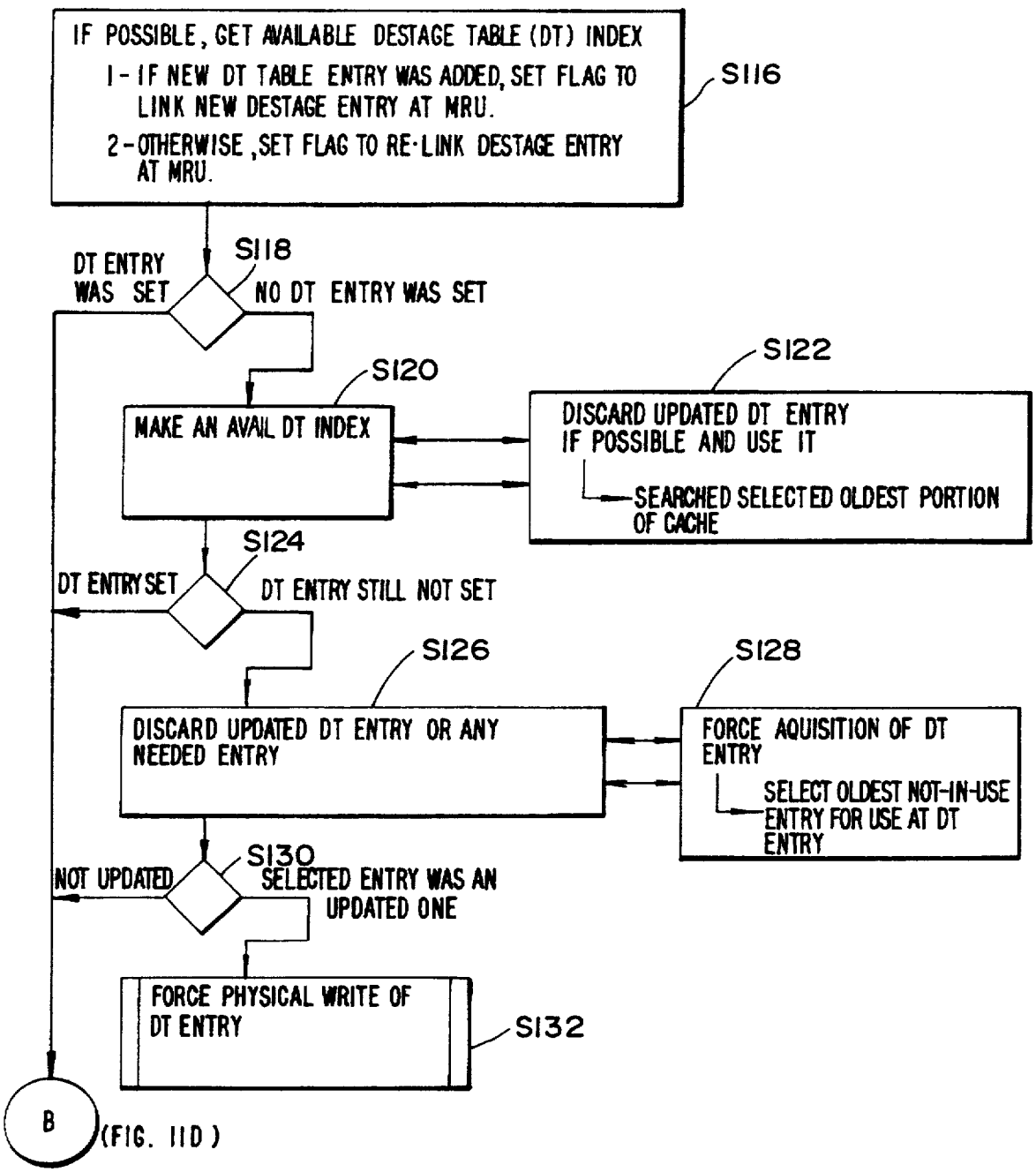

Selection of Index for DT Entry:

The selection of an index for destage table entry is depicted in greater detail in FIG. 11B. In step S116, if possible, the available destage table (DT) index will be attained. This entails the performance of either a first or a second step. The first step is performed if a new DT entry was added, in which case a flag is set to link the new destage entry at MRU. Otherwise, if the new DT table entry was not added, the second step will be performed, in which case the flag will be set to re-link the destage entry at MRU.

The process then proceeds to step S118. At step S118, the process determines whether or not the DT entry was set in step S116. If not, the process proceeds to step S120, where an available DT index is made. This entails discarding an un-updated DT entry if possible, and using that entry. In performing this step, the processor searches a selected oldest portion of the cache. The system may be implemented so that the definition and size of the selected oldest portion can be user-configured.

Figure 11D:
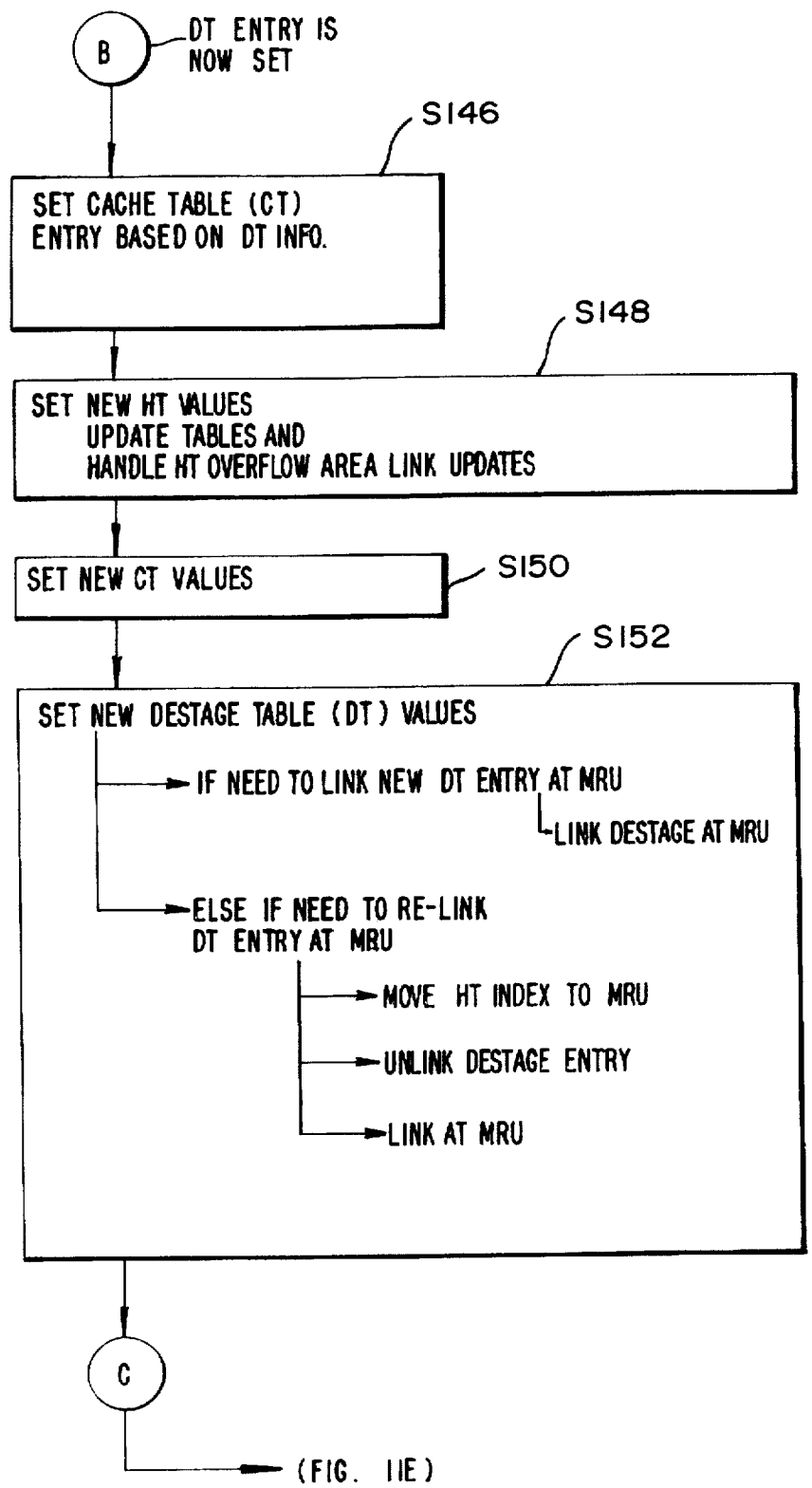

If the DT entry was set as determined in step S118, the process proceeds to step S146 which is shown in FIG. 11D.

Continuing on after execution of step S120 and step S122, the process then proceeds to determination step S124, and determines if the DT entry is still not set. If it is still not set, the process proceeds to step S126 where the updated DT entry is discarded. In this regard, step S128 is performed in which there is a forced acquisition of a DT entry. Thus, the oldest non-in-use entry is selected for use at the DT entry. Upon execution of step S126 and step S128, a determination is made at step S130 of whether the selected entry was an updated one. If it was an updated entry, a forced physical write must be performed for that DT entry in step S132. If the entry was not updated, the process may proceed to step S146, as shown in FIG. 11D.

Forced Physical Write:

FIG. 11C includes a flow diagram which illustrates the forced physical write processing performed in conjunction with the example main cache routine. The forced physical write processing of FIG. 11C is started at step S132, as shown in FIG. 11B.

Before execution of the forced physical write, at step S134, the routine will wait until the appropriate I/O thread is available. After the I/O thread becomes available, at step S136, an I/O packet will be set up for the target disk thread, and the count of updated records will be decremented. Thereafter, at step S138, the I/O initialized indication flag will be set, and at step S140, the I/O request semaphore will be cleared, thus causing the appropriate I/O threads to execute. An example I/O thread routine is illustrated in FIG. 9.

Depending on how the system is configured by user configuration mechanism 34', the forced physical write may contain step S142, at which a cache drain-on-write is performed. If such a step is not configured to be present within the forced physical write routine, the process proceeds directly to step S144, where the routine proceeds when a physical I/O is complete, for the selected DT entry. Thus, the routine at that point will proceed to step S146 of the main cache routine, which is shown in FIG. 11D. At that point, the DT entry is now set.

At step S146, the routine sets the cache table (CT) entry based upon the DT information. Then, at step S148, new HT values are set, the tables are updated, and HT overflow area link updates are handled. At step S150, the new CT values are set in accordance with the appropriate requirements of the system.

Thereafter, at step S152, the new destage table (DT) values are set. In this regard, if there is a need to link a new DT entry at MRU, the routine links that destage at MRU. On the other hand, if there is a need to re-link the DT entry at MRU, the HT index is moved to MRU, the destage entry is unlinked and the destage entry is then linked at MRU. The routine then proceeds to step S154 of the main cache routine which is depicted at the top of FIG. 11E.

In step S154, the routine will proceed only when the I/O thread is available. Once the I/O thread is available, the routine will proceed to step S156, where the appropriate I/O packet will be set up for the target disk thread of concern. Then, at step S158, the routine will set the I/O initialized indication flag. At step S160, the I/O request semaphore will be cleared, thus causing the corresponding I/O thread of the appropriate target disk to be executed (see FIG. 9). Thereafter, at step S162, a pre-read processing is executed. After the pre-read processing is executed, the routine proceeds to perform a cache drain-on-read at step S164, if the system is so configured, as determined by user configuration module 34'. However, if the system is not so configured, the routine proceeds directly from step S162 to step S168. In any event, the routine ends up at step S168, at which point a value is set for the pointer to the requested cache buffer.

Figure 11E:
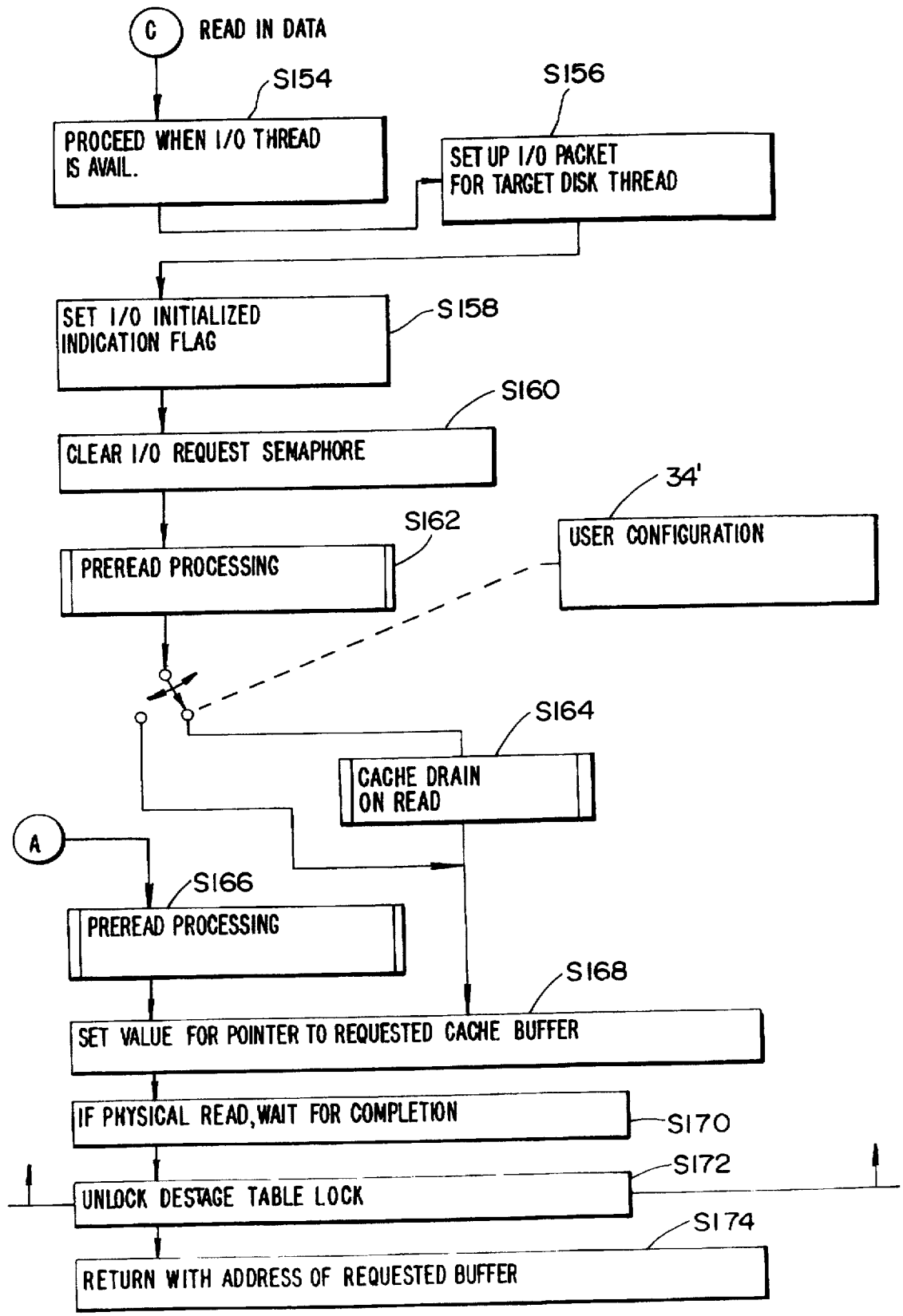

Returning to FIG. 11A, for the case when the HT index was originally found, thus meaning that the requested data block was already in cache, the main cache routine will proceed directly from step S114 to step S166, which is shown in FIG. 11E, where a pre-read processing will be performed in conjunction with the data access request made by the requester. Thereafter, the routine continues from step S166 to step S168.

Subsequent to execution of step S168, if any forced physical read is in process for the originally requested data, the routine will wait for completion of the same in step S170. Thereafter, in step S172, the destage table lock will be unlocked, thus allowing access to the DT table by another routine within the system. At step S174, the main cache routine returns, providing information allowing access to the data of the requested buffer to the requester.

In executing either a cache drain-on-write or a cache drain-on-read process, the illustrated exemplary main cache routine will perform several steps as illustrated in FIG. 12. In particular, for each target disk on which an I/O has not already been requested, and which is in a particular set of meshed disks, the process will search, at step S176, the DT for the LRU updated not-in-use item for the selected target disk. Thereafter, at step S178, the process will set the I/O initialized indication flag. At step S180, the I/O packet will be set up for the target disk thread, and the count of updated records will be decremented. At step S182, the I/O request semaphore will be cleared, thus causing the appropriate I/O thread to be executed (see FIG. 9). Once all of the iterations are completed, and each of steps S176–S182 have been executed for each eligible target disk, the cache drain-on-read or drain-on write processing will return to the point at which it was called.

Figure 13A:
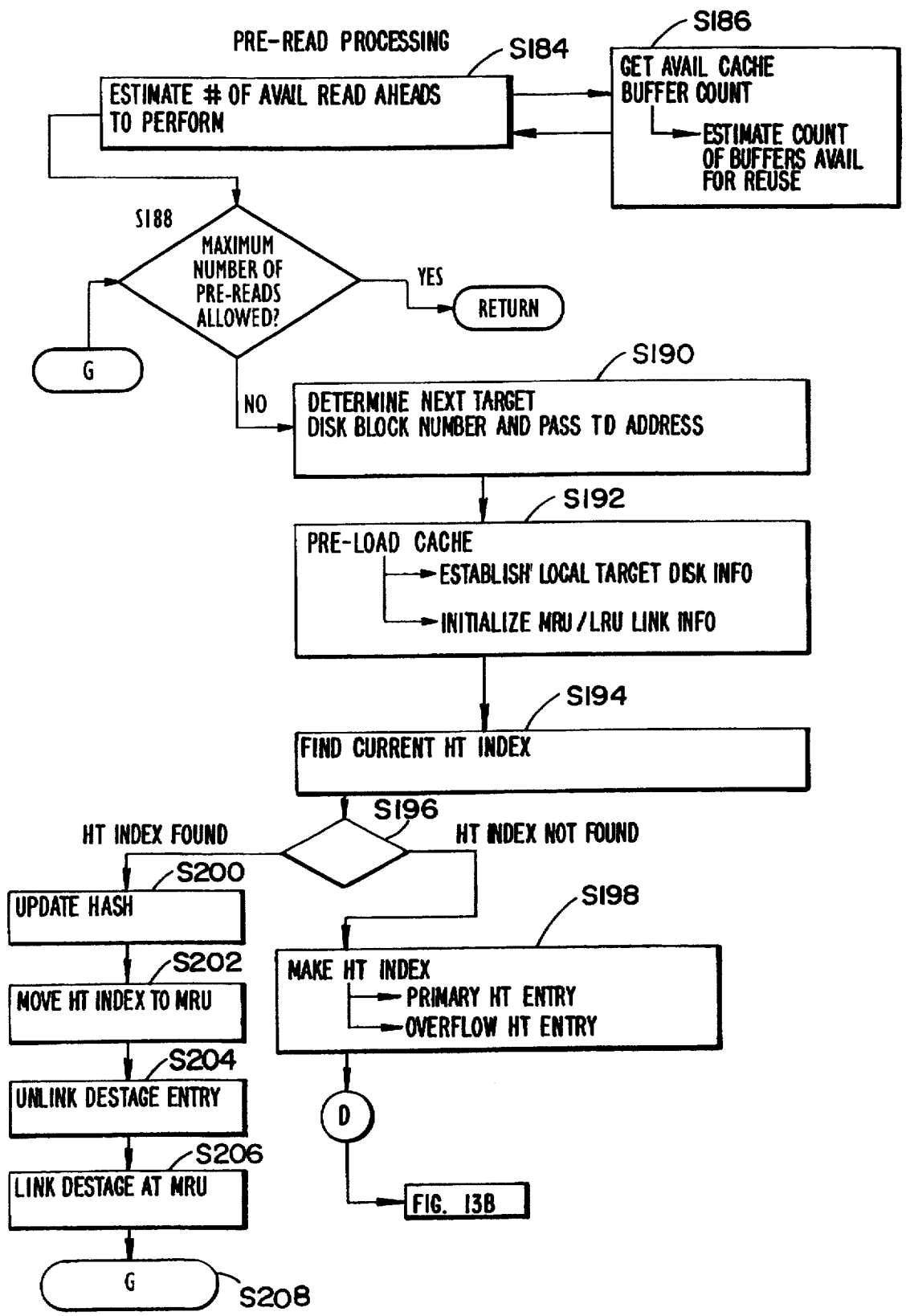

FIGS. 13A–13D include a detailed diagram of an example pre-read processing which can be performed in conjunction with the exemplary detailed illustrative, but non-limiting, main cache routine which is depicted in FIGS. 11A–11E. Referring to FIG. 13A, in execution of the pre-read process, at step S184, the process estimates the number of available read aheads which are to be performed. In this regard, step S186 is performed, in which the available cache buffer count is obtained; that is, the process estimates the count of buffers available for immediate re-use. The pre-read processing then executes step S188, for the number of possible pre-reads allowed. The number of pre-reads allowed will be based on either a maximum number k, as configured by the user, or based on the estimated available cache buffer count. If the estimated available cache buffer count is less than the maximum number, the estimated count will be used.

From step S188 the process proceeds to step S190. At step S190, the next target disk block number is determined, and the process passes the target disk address corresponding to the determined target disk block number. Thereafter, at step S192, the cache is pre-loaded. In this regard, the process establishes local target disk information, and initializes the MRU/LRU link information. At step S194, the current HT index is obtained. If the HT index is found, as determined at step S196, the process proceeds to step S200, where several table processing steps are performed in conjunction with steps S200, S202, S204, and S206 (see, e.g., steps S108, S110, and S114 and the text corresponding thereto). Thereafter, the process will return to stop S188, thus returning to step S190 for each possible pre-read. If the HT index is not found, as determined at step S196, the process proceeds to step S198, where the HT index is made.

Figure 13B:
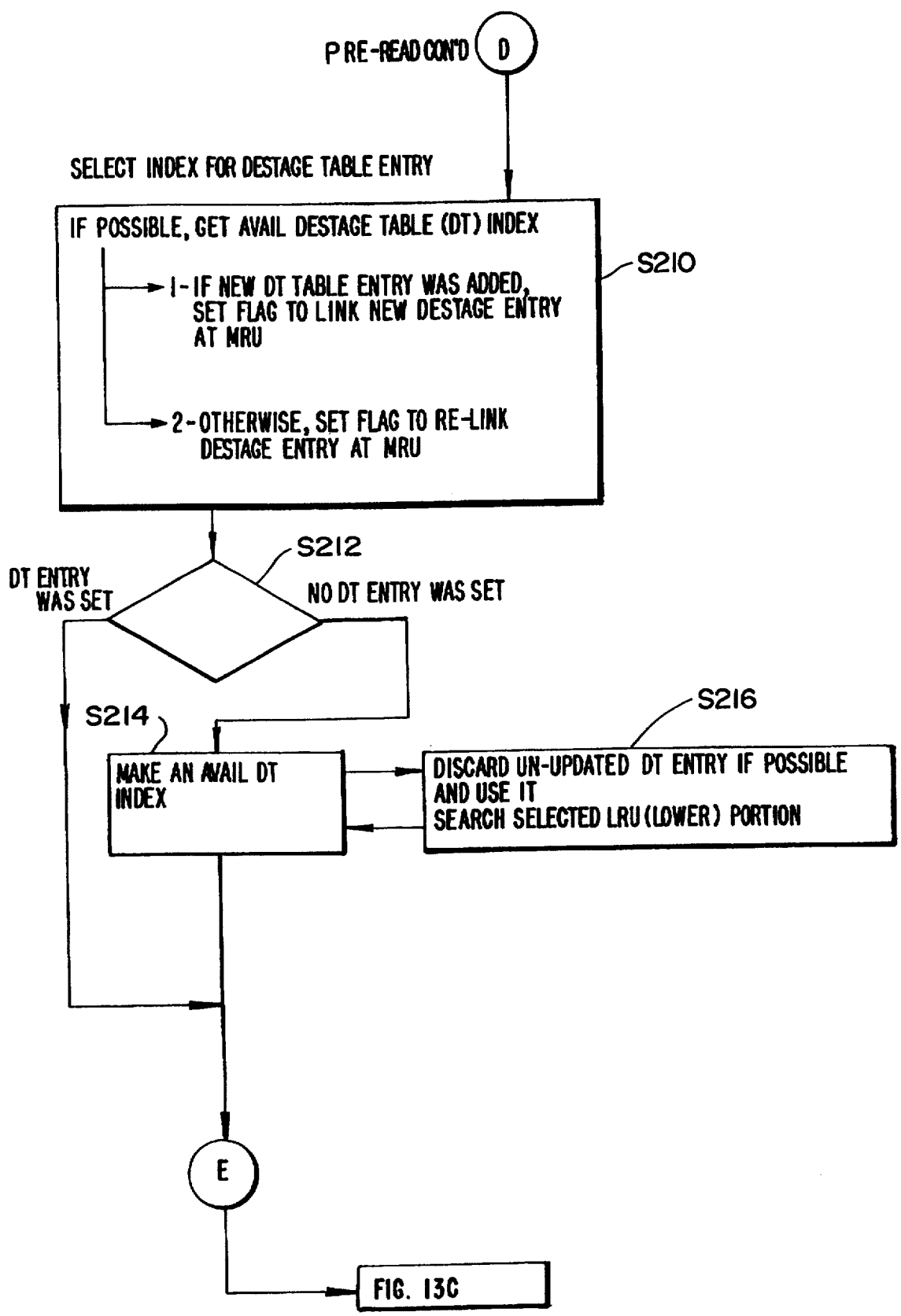

Continuing on to FIG. 13B, at step S210, if it is possible, the process will get the available destage table index. If the DT entry was set during execution of step S210, as determined at step S212, the process proceeds directly to step S218, which is shown at the top of FIG. 13C. If no DT entry was set, the process proceeds to step S214, where an available DT index will be made. In this regard, step S216 will be executed, in which the un-updated DT entry will be discarded, if possible, and used. In order to determine if such a use is possible, a selected LRU (lower) portion of the cache will be searched.

Continuing on at step S218, which is shown at the top of FIG. 13C, a determination is again made. In this determination, it is determined whether or not the DT entry was set. If the DT entry was not set, the process returns. The fact that no DT entry was set means that no un-updated entries are available, and a physical write would have been needed to accomplish the pre-read. The process returns at this point because a physical write will not be performed in the pre-read processing.

If the DT entry was set, the process proceeds to step S220. At step S220, the cache table entry will be set based upon the DT information. Thereafter, at step S222, new HT values will be set, the tables will be updated, and HT overflow area link updates will be handled. Thereafter, at step S224, the new CT values will be set, and at step S226, the new destage table values will be set.

Figure 13D:
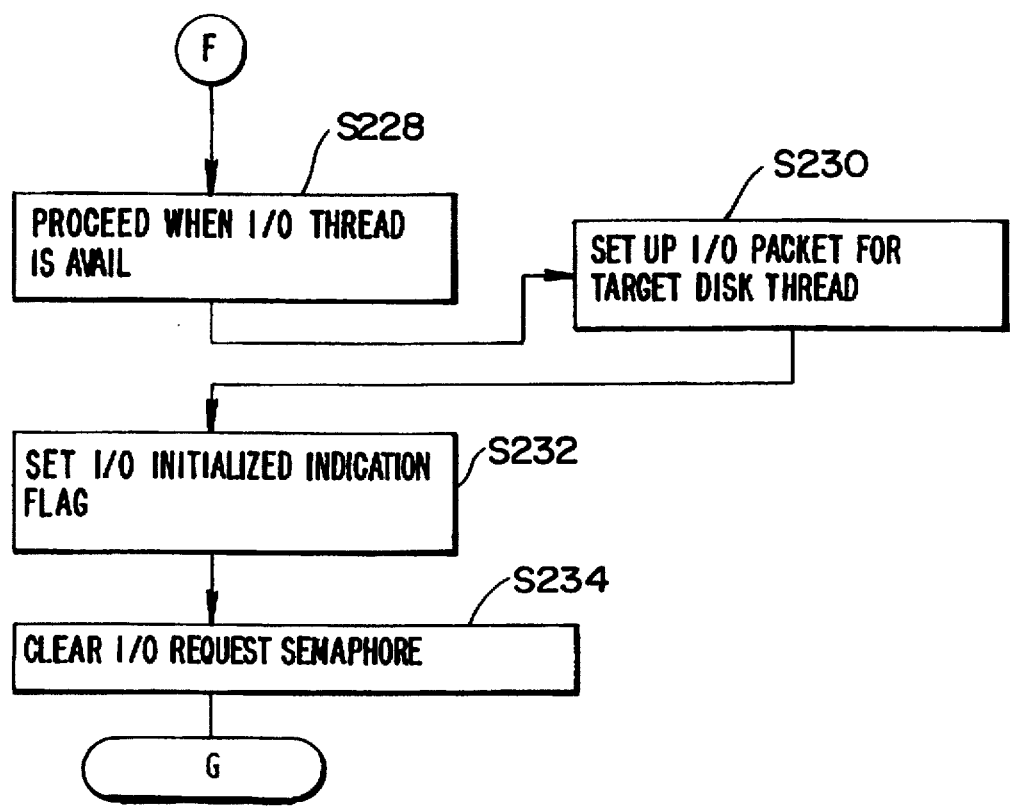

After execution of step S226, the process will proceed to step S228, which is shown at the top of FIG. 13D. At step S228, the process will wait until the I/O thread is available; then it will proceed to step S230, where the I/O packet will be set up for the target disk thread of concern. At step S232, the I/O initialized indication flag will be set, and at step S234, the appropriate I/O request semaphore will be cleared. Thus, as a result of execution of step S234, the I/O thread will be executed, thus causing physical I/O to the disk (see FIG. 9). The process will return to step S188 after step S234, for the number of possible pre-reads that are allowed for step S188. After the maximum allowable number of pre-reads as determined by step S188, the pre-read process will return to the point at which it was called.

The Data Structures

Several data structures used by the example main cache routine described above are defined as follows:

General Variables

Cache Table Target Disk Number: This holds the disk number for the target disk location for the data in the associated Cache Buffer.

Cache Table Source Disk Offset: This holds the disk block offset for the source disk location for the data in the associated Cache Buffer.

Cache Table Source Disk Number: This holds the disk number for the source disk location for the data in the associated Cache Buffer.

Cache Table in Error Flag: This flag is set when an I/O corresponding to the Cache Buffer associated with this Cache Table Entry fails.

Cache Table I/O Pending Flag: This flag is set when an I/O operation is pending on the buffer associated with this Cache Table Entry. This prevents I/O routines from re-selecting this buffer for I/O operations once it has already been selected for an I/O which has not yet completed. Once the I/O is scheduled, the Cache Table Record Updated Flag will be cleared, so this flag's setting prevents re-use of the buffer before the I/O completes.

I. Cache Buffer

This is an array of memory areas in which data from disk resides while in cache.

II. Destage Table Entry Structure

This is an array of information concerning each Cache Buffer.

Destage Table Entry Prior: This is the index of the prior Destage Table Entry in the Destage Table Entry chain.

Destage Table Entry Next: This is the index of the next Destage Table Entry in the Destage Table Entry chain.

Destage Table Hash Table Index: This is the index of the Hash Table Entry associated with the same Cache Buffer associated with this Destage Table Entry.

Destage Table Target Disk Number: This is the disk number of the target disk on which the associated Cache Buffer's data resides. This is used primarily for debug purposes.

III. Destage Table Structure

This is an array of Destage Table Entries, one for each Cache Buffer. This structure constitutes a double linked list of entries always kept linked in sorted order ranging from the entry associated with the Cache Buffer which was most recently used (MRU) to the entry associated with the Cache Buffer which was least recently used (LRU). This list is used by the cache system to assist in making the decision as to which Cache Buffer should be re-used (or initially used) for holding data for a data request. It is also used in determining which cache buffer(s) should be written out. In reality, there are two chains present here, one for in-use entries, and one for non-in-use entries, though the not-in-use chain is quickly depleted and never re-establishes itself. The not-in-use chain is only used to allow the chain to initialize.

IV. Target Disk I/O Structure

This structure is used to control the I/O requests established by the cache system. It, therefore, is only concerned with target disk I/O operations.

Target Disk I/O Thread Identification: This value holds the identification number for the activity thread used to accomplish I/O with a target disk. There is an array of these entries, one for each target disk (and there is also one I/O thread for each target disk).

Target Disk I/O locks: These are semaphores set up for each target disk I/O thread used to hold the I/O threads when they are inactive, to begin the I/O thread to process an I/O request, and to hold requests and data usage when an I/O is pending on a target disk.

Target Disk I/O Packet: This set of values holds information pertinent to an I/O request. There is one packet for each target disk. The I/O requestor fills in the packet when an I/O is not pending on the target disk, then unlocks the target disk's I/O thread to perform the I/O defined in the packet. Depending on cache configuration values, ancillary I/O may also be triggered by an I/O request. The packet includes the following types of information:

I/O Operation to perform.
Target disk offset to perform the I/O on.
Cache Buffer Index for the I/O.
I/O size.
Source disk number and offset involved.

V. Cache Table Log Structure

In this structure a list is maintained of the status of each Cache Buffer. This information can be written to non-volatile storage in order to ensure that a system failure does not result in an inability to identify lost cache data information.

Source Disk Number: The source disk number for the data in the associated Cache Buffer.

Source Disk Offset: The source disk offset for the data in the associated Cache Buffer.

Updated Flag: Set when the data in the associated Cache Buffer is updated relative to the image on the target disks.

VI. Cache Control Structure

This structure contains status information on cache as a whole. It is used primarily to allow and ensure cache draining prior to a shutdown.

Lock: This lock is a semaphore to control access to this structure.

Updated Cache Record Count: This variable holds a count of the number of updated records in cache at any time.

Updated Record Exists Lock: This semaphore is kept set whenever the Updated Cache Record Count is not zero.

Hash Table Entry Structure: This structure holds hashing information to allow rapid look up of desired data buffers in cache.

VII. Hash Table Cache Table Index

This contains an index into the Cache Table for the data whose address hashes to this Hash Table entry. If this entry is not in use, a flag is set here to indicate such.

Prior This Hash: This is the Hash Table Entry number of the prior Hash Table Entry which has the same hash look up value as this Hash Table Entry.

Next This Hash: This is the hash Table Entry number of the next Hash Table Entry which has the same hash look up value as this Hash Table Entry.

VIII. Hash Table Structure

This structure is an array of Hash Table Entries, one for each possible hash index PLUS one for each cache buffer. The first part of this Table is considered to be the Primary Hash Table Entry set. The second part is the Overflow Hash Table Entry set. Any hash look up originates by calculating a Hash Table Index based on the target disk number and offset of the target disk location where the data is to reside module by the configured number of Primary Hash Table Entries. To then find if the desired data is in a cache buffer, the calculated hash Table Entry is reviewed. If the Hash Table Cache Table Index is not flagged as in use, then the Next This Hash field of the calculated primary Hash Table Entry is reviewed. If it indicates that there is a next entry in the Hash Table chained to it (i.e., the data reflected in it has the same calculated hash index as the entry that points to it), then that entry is reviewed. In any case, whenever a Hash Table Entry is found that does indicate that it is associated with a Cache Table Entry, the associated Cache Table Entry is reviewed to check if it represents the requested data buffer. If not, additional Overflow Hash Table Entries are reviewed (based on Next This Hash values) until all in the chain are reviewed or until a match is found. If the Primary Hash Table Entry (i.e., the one whose index was calculated) indicates that it points to a Cache Table entry, the associated Cache Table Entry is reviewed to check if it represents the requested data buffer. If not, the Overflow Hash Table Entries are reviewed (based on Next This Hash values) until all in the chain are reviewed or until a match is found, as previously described. The double linked list of entries is maintained as data is added to and removed from cache buffers. Note, however, that the Primary Hash Table Entries are static, only the Overflow Hash Table Entries can be linked to Primary Hash Table Entries, and only Overflow Hash Table Entries can be released completely to be chained to any chain of entries with a common calculated hash index. Unused Overflow Hash Table Entries are maintained in a single linked list and the start of that list is separately maintained. This allows for a no-search determination of an overflow entry to use.

Hash Table Entries: As described with the Hash Table Entry Structure.

IX. Cache Table Structure

This table contains most essential information for every cached piece of data. It is used to identify data in cache and to determine when a cache buffer can be released and re-used. It also indicates if the buffer it is associated with is updated or not, allowing write operations to write updated data and allowing suitable decisions to be made when a buffer is needed for a read operation. There is one entry per Cache Buffer.

Cache Table Entry Next: When initially filling cache, this points to the cache table entry to be used next.

Cache Table Destage Table Index: This is the index into the Destage Table for this cache entry.

Cache Table Record Updated Flag: This is set whenever the cache buffer identified with this Cache Table Entry is in an updated state.

Cache Table Record in Use Flag: This flag is set whenever the cache buffer identified with this Cache Table Entry is being referenced. This allows the cache system to recognize when an un-updated cache buffer is in use and must not be selected as a candidate for re-use.

Cache Table Hash Table Entry Index: This is the index of the Hash Table Entry associated with this Cache Table Entry.

Cache Table Data Index: This is the index used to identify the Cache Buffer (i.e., data) associated with this Cache Table Entry.

Cache Table Number of Target Disk Blocks: This holds the number of target disk blocks required for the Cache Buffer it is associated with.

Cache Table Target Disk Offset: This holds the disk block offset for the target disk location for the data in the associated Cache Buffer.

Although the presently disclosed storage subsystem may be implemented with hardware, or software controlled hardware, or any combination of the same, a significant aspect of the present invention is that the features facilitate implementation of the complete system with the use of a general purpose computer controlled with software. Thus, the memory subsystem of the present invention has a minimized hardware dependency, and a maximized mobility in that it is implementable with different hardware systems.

In accordance with one aspect, the entire I/O system of the storage subsystem of the present invention may be designed and implemented to be re-entrant and to fully support multi-tasking. It is noted that some evidence has suggested an approximate 25% improvement in performance results when a mesh factor of 2 is used instead of a mesh factor of 1. An additional improvement has been seen with larger mesh factors.

While the invention has been described with reference to preferred embodiments, it is understood that the words which have been used herein are words of description, rather than words of limitation. Changes may be made, within the purview of the appended claims, without departing from the scope and spirit of the invention in its aspects. Although the invention has been described herein in reference to particular means, materials and embodiments, it is understood that the invention is not to be limited to the particulars disclosed herein, and that the invention extends to all equivalent structures, methods, and uses, such as are within the scope of the appended claims.

What is claimed is:

1. A data processing system comprising:

a processor that operates on various data, said processor comprising means for specifying a source address that identifies a requested data block located within a memory to be accessed by said processor, and means for requesting allocation of memory space in order to hold a specified data string, said data string having a length that requires a storage space of a specified plurality of data blocks;

memory allocation means for allocating blocks of memory space for said specified plurality of data blocks, and for assigning source addresses to each of the allocated blocks of memory, the assigned source addresses comprising a series of adjacent addresses;

a hierarchical memory system for holding data, said hierarchical memory system comprising a first level memory and a second level memory, first data held within said first level memory being available for quicker access by said processor as compared to second data held within said second level memory, said second level memory comprising a plurality of sub-memories and a plurality of physical data exchange paths which are connected to respective ones of said submemories; and assignment means comprising mapping means for mapping source addresses to target addresses and meshing means for assigning adjacent source-addressed data blocks to sub-memories, wherein said meshing means comprises means for assigning said series of adjacent source-addressed data blocks on a per-block basis per I/O request to each of said sub-memories on a rotating basis, and wherein no other adjacent source-addressed data block of said series of adjacent addresses is assigned by said meshing means to a same one of said sub-memories.

2. The data processing system according to claim 1, wherein each of said data blocks are equal in length.

3. The data processing system according to claim 1 wherein each said sub-memory comprises a disk.

4. The data processing system according to claim 3, wherein said first level memory comprises a cache.

5. The data processing system according to claim 1, wherein each said assigned set comprises N adjacent source-addressed data blocks, and wherein said meshing means comprises means for assigning each data block within a given set to a respective one of N sub-memories.

6. The data processing system according to claim 5, further comprising configuration means for configuring said system, said configuration means comprising means for setting N to an integer value ranging from 1 to the number of said plurality of sub-memories available for storage.

7. A data processing system comprising:

a processor that operates on various data, said processor comprising a processor memory, means for specifying a source address that identifies a requested data block located within another memory to be accessed by said processor, and means for requesting allocation of memory space in order to hold a specified data string, said data string having a length that requires a storage space of a specified plurality of data blocks;

memory allocation means for allocating blocks of memory space for said specified plurality of data blocks, and for assigning source addresses to each of the allocated blocks of memory, the assigned source addresses comprising a series of adjacent addresses when possible;

a hierarchical memory means comprising a cache and a long-term storage which has several independent sub-memories; and a storage control processor comprising pre-fetch means for making data blocks available within said cache for future access by said processor, said pre-fetch means comprising physical pre-read means, responsive to a request made by said processor for access to a specified data block identified by a specified source address, for performing a physical read on a per-block basis per I/O request from said long-term storage of selected adjacently addressed data blocks based on a current I/O request from the processor and the contents of the cache, said selected adjacently addressed data blocks identified by a source address adjacent to said specified source address being stored in separate sub-memories of said several independent sub-memories different than a specified sub-memory of said sub-memories where said specified source address is stored.

8. A data processing system comprising:

a host computer that operates on various data, said host computer comprising a processor memory and means for specifying, according to a source addressing scheme, a source address of a source block that corresponds to a requested data block located within another memory to be accessed by said host computer; and an external memory for storing data within target blocks according to a target addressing scheme;

said storage controller comprising:

address mapping means for correlating source addresses specified by said processor with target addresses that correspond to storage locations within said another memory, wherein said address mapping means comprises meshing means for distributing a set of adjacent source addresses on a per-block basis per I/O request to a plurality of sub-memories, and for assigning adjacent source addresses within said set of adjacent source addresses to different ones of said plurality of sub-memories; and configuration means for defining several parameters of said address mapping means based upon the physical storage characteristics of said external memory, to thereby configure said address mapping means to correlate source addresses of source blocks specified by said host computer with target addresses of target blocks that correspond to storage locations within said external memory.

9. The data processing system according to claim 8, wherein said configuration means comprises first setting means for setting the number and size of source blocks within said source addressing scheme, and wherein said configuration means further comprises second setting means for setting the number and size of target blocks to be addressed within said external memory.

10. The data processing system according to claims 9, wherein said first and second setting means comprise means for accepting user input without reprogramming said storage controller.

11. The data processing system according to claim 8, wherein said external memory comprises a plurality of sub-memories and a plurality of physical data exchange paths which are connected to respective ones of said sub-memories.

12. The data processing system according to claim 11, further comprising a cache and means for reading and writing data between said cache and said sub-memories, said reading and writing means comprising reading means for reading from a sub-memory a target block corresponding to a requested source block, requested by said host computer, into said cache, and for concurrently reading from said sub-memories other target blocks, not corresponding to said requested source block, into said cache, when the other target blocks are located in separate respective sub-memories.

13. The data processing system according to claim 12, wherein said reading and writing means further comprises writing means for writing a forwarded source block, forwarded by said host computer, from said cache to a target block of a sub-memory, and for concurrently writing data from said cache to other target blocks of said sub-memories, when the other target blocks are located in separate respective sub-memories.

14. A data processing system comprising:
   a host processor, said host processor specifying at least one of a plurality of adjacent source addresses identifying at least one requested data block located within a memory to be accessed by said processor, said host processor requesting allocation of storage space in a first memory to store a data string if said at least one requested data block is not present in said first memory; and
   a memory subsystem, said memory subsystem comprising an I/O processor for allocating blocks of memory to store said data string in said first memory and for mapping source addresses to target addresses, a hierarchical memory system, a subsystem control, and an I/O device manager, said hierarchical memory comprising said first memory connected by said subsystem control to a second memory, said second memory comprising a plurality of sub-memories and connected to said I/O device manager,
   wherein said I/O processor distributes each of said plurality of adjacent source addresses on a per-block basis per I/O request to one of said plurality of sub-memories on a rotating basis, and wherein no other adjacent source-addressed data block of said plurality of adjacent source addresses being distributed is assigned by said I/O processor to said one of said plurality of submemories.

15. The data processing system according to claim 14, wherein each of said requested data blocks are equal in length.

16. The data processing system according to claim 14, wherein each of said plurality of sub-memories comprises a disk.

17. The data processing system according to claim 14, wherein said first memory is a cache memory.

18. The data processing system according to claim 14, wherein said plurality of adjacent source addresses comprises N adjacent source addresses and said plurality of sub-memories comprises N sub-memories, and wherein said I/O processor meshes each of said N adjacent source address to one of said N sub-memories.

* * * * *